(12) United States Patent
Yu et al.

(10) Patent No.: US 11,895,534 B2
(45) Date of Patent: Feb. 6, 2024

(54) DATA TRANSMISSION METHOD AND COMMUNICATION APPARATUS

(71) Applicant: HUAWEI TECHNOLOGIES CO., LTD., Shenzhen (CN)

(72) Inventors: Yawei Yu, Shenzhen (CN); Chaojun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 407 days.

(21) Appl. No.: 17/352,749

(22) Filed: Jun. 21, 2021

(65) Prior Publication Data
US 2021/0314814 A1 Oct. 7, 2021

Related U.S. Application Data

(63) Continuation of application No. PCT/CN2019/124795, filed on Dec. 12, 2019.

(30) Foreign Application Priority Data

Dec. 21, 2018 (CN) .......................... 201811573994.0

(51) Int. Cl.
*H04W 72/12* (2023.01)
*H04W 28/06* (2009.01)
(Continued)

(52) U.S. Cl.
CPC ........... *H04W 28/06* (2013.01); *H04L 1/0003* (2013.01); *H04L 1/0007* (2013.01)

(58) Field of Classification Search
None
See application file for complete search history.

(56) References Cited

U.S. PATENT DOCUMENTS

2013/0201886 A1   8/2013  Spencer et al.
2013/0294251 A1  11/2013  Hoshino et al.
(Continued)

FOREIGN PATENT DOCUMENTS

CN   101677454 A   3/2010
CN   103378936 A  10/2013
(Continued)

OTHER PUBLICATIONS

ZTE, Sanechips, Considerations on BG Determination. 3GPP TSG RAN WG1 Meeting #91, Reno, USA, Nov. 27-Dec. 1, 2017, R1-1721440, 7 pages.
(Continued)

*Primary Examiner* — Sai Aung
(74) *Attorney, Agent, or Firm* — HAUPTMAN HAM, LLP

(57) ABSTRACT

Embodiments of this application provide a data transmission method and a communication apparatus. The method includes: A network device sends first information to a terminal device, where the first information is used to indicate transport block size TBS configuration information and/or redundancy version RV configuration information, the TBS configuration information is used to configure a first transport block size TBS, and the RV configuration information is used to configure first RV information. The network device receives a transport block from the terminal device, or the network device sends a transport block to the terminal device, where a TBS of the transport block is the first TBS, and/or RV information of the transport block is the first RV information. The network device may expand a TBS and/or refine an RV by using the TBS configuration information and/or the RV configuration information, thereby improving a spectral efficiency when the TB is transmitted.

20 Claims, 3 Drawing Sheets

(51) Int. Cl.
*H04L 1/18* (2023.01)
*H04L 1/00* (2006.01)

(56) References Cited

U.S. PATENT DOCUMENTS

| | | | | |
|---|---|---|---|---|
| 2018/0219649 | A1* | 8/2018 | Ying | H04W 76/27 |
| 2020/0037314 | A1* | 1/2020 | Xiong | H04L 1/08 |
| 2020/0213978 | A1* | 7/2020 | Iyer | H04W 56/0005 |
| 2020/0221429 | A1* | 7/2020 | Li | H04L 5/0053 |
| 2020/0235891 | A1* | 7/2020 | Lei | H04L 1/1864 |
| 2021/0227548 | A1* | 7/2021 | Shapin | H04L 5/0064 |
| 2021/0385056 | A1* | 12/2021 | Zhou | H04B 7/088 |

FOREIGN PATENT DOCUMENTS

| | | |
|---|---|---|
| CN | 103648175 A | 3/2014 |
| CN | 106559201 A | 4/2017 |
| CN | 107852313 A | 3/2018 |
| EP | 3413492 A1 | 12/2018 |
| WO | 2018031620 A1 | 2/2018 |

OTHER PUBLICATIONS

Intel Corporation, Remaining details of PDSCH repetitions. 3GPP TSG RAN WG1 Meeting #93, Busan, Korea, May 21-25, 2018, R1-1806494, 4 pages.
International Search Report issued in corresponding International Application No. PCT/CN2019/124795, dated Mar. 11, 2020, pp. 1-9.
Chinese Office Action issued in corresponding Chinese Application No. 201811573994.0, dated Dec. 3, 2020, pp. 1-56.
Ericsson: "E-DCH Physical Layer Hybrid ARQ Processing", 3GPP Draft; R1-041179,Sep. 15, 2004, XP050099375, total 3 pages.
Nokia: "Rate matching for LDPC", 3GPP Draft R1-1711536,Jul. 26, 2017, XP051300721, total 5 pages.
European Search Report issued in corresponding European Application No. 19900950.7, dated Dec. 17, 2021, pp. 1-13, European Patent Office, Munich, Germany.

* cited by examiner

DATA TRANSMISSION METHOD AND COMMUNICATION APPARATUS

CROSS-REFERENCE TO RELATED APPLICATIONS

This application is a continuation of International Application No. PCT/CN2019/124795, filed on Dec. 12, 2019, which claims priority to Chinese Patent Application No. 201811573994.0, filed on Dec. 21, 2018. The disclosures of the aforementioned applications are hereby incorporated by reference in their entireties.

TECHNICAL FIELD

Embodiments of this application relate to communication technologies, and in particular, to a data transmission method and a communication apparatus.

BACKGROUND

Currently, in a new radio (NR) system, the following manners are used to ensure transmission of TBs on an uplink data channel and a downlink data channel: 1. An adaptive modulation and coding (AMC) scheme is used to modulate and encode to-be-transmitted TBs on the uplink data channel and the downlink data channel, to select a proper modulation and coding scheme to adapt to radio channel quality and ensure transmission quality of a link. 2. Low density parity check coding (LDPC) is used to encode and decode to-be-transmitted TBs on the uplink data channel and the downlink data channel, to improve reliability of data transmission by increasing check bits. 3. A hybrid automatic repeat request (HARQ) technology is used to perform automatic retransmission and combined decoding on a TB that fails to be transmitted, to ensure correctness of data transmission.

In a current technology, to ensure that demodulation and decoding can be performed correctly at a relatively high probability during an initial transmission, a smaller equivalent transmission code rate is used for transmitting a redundancy version (RV) of a TB on an uplink data channel or a downlink data channel. A smaller equivalent transmission code rate indicates a larger quantity of transmitted redundant check bits and a lower spectral efficiency. In addition, a receiving device may correctly decode the TB only when a total quantity of bits obtained after combined transmissions/HARQ retransmissions exceeds a quantity of bits required for correct channel decoding. However, start positions of four RVs of a mother code obtained after LDPC coding are defined in the current NR system, where a distance between start positions of different RVs is relatively large. To ensure correct decoding, a length of a transmitted RV needs to be greater than or equal to a distance between start positions of two adjacent RVs. That is, the distance between the start positions of two adjacent RVs is a minimum granularity of a length of an RV. Consequently, a granularity of an RV transmitted each time is relatively large. Therefore, when a plurality of HARQ retransmissions are combined until the correct decoding of the TB, a total quantity of transmitted bits may be significantly greater than a smallest quantity of bits required for correct decoding of a current channel, resulting in a relatively low spectral efficiency. In other words, the spectral efficiency is relatively low when the foregoing manner is used to transmit the TB.

SUMMARY

Embodiments of this application provide a data transmission method and a communication apparatus, to resolve a technical problem that a spectral efficiency is relatively low when an existing manner is used to transmit a TB.

According to a first aspect, an embodiment of this application provides a data transmission method. In the method, a network device sends first information to a terminal device, where the first information is used to indicate transport block size TBS configuration information and/or redundancy version RV configuration information, the TBS configuration information is used to configure a first transport block size TBS, and the RV configuration information is used to configure first RV information. The network device receives a transport block from the terminal device, or the network device sends a transport block to the terminal device, where a TBS of the transport block is the first TBS, and/or RV information of the transport block is the first RV information.

In the foregoing method, the network device may indicate the TBS configuration information and/or the RV configuration information to the terminal device by using the first information, and the network device may expand a TBS and/or refine an RV by using the TBS configuration information and/or the RV configuration information, so that the network device and the terminal device may transmit the TB by using the expanded TBS and/or the refined RV, thereby improving a spectral efficiency when the TB is transmitted.

In a possible implementation, the first RV information includes at least one of the following information: a quantity M of RVs and start position information of the M RVs, where M is an integer greater than or equal to 1. In an example, a start position of each RV may be determined based on a length of the mother code obtained after transport block coding and a number of the start position of the RV in start positions of the M RVs. For example, the start position of each RV is determined based on the length of the mother code obtained after transport block coding, a first parameter, and the number of the start position of the RV in the start positions of the M RVs, where the first parameter is used to determine a check matrix dimension corresponding to a coding scheme used by the transport block; or the start position of each RV is determined based on the length of the mother code obtained after transport block coding, M, the number of the start position of the RV in the start positions of the M RVs, and a preset bit offset.

In this possible implementation, the network device may flexibly indicate, based on a transmission requirement, a granularity of an RV used when the TB is transmitted between the network device and the terminal device, so that a spectral efficiency when the TB is transmitted may be improved when the refined RV is used.

In a possible implementation, the method further includes: The network device determines a sequence of the M RVs. Optionally, the first RV information further includes the sequence of the M RVs. Alternatively, the method further includes: The network device sends second information to the terminal device, where the second information is used to indicate a sequence of the M RVs. In this implementation, that the network device receives a transport block from the terminal device, or that the network device sends a transport block to the terminal device includes: The network device receives a first RV of the transport block from the terminal device, or the network device sends a first RV of the transport block to the terminal device, where the first RV is an RV in the M RVs. Optionally, the method further includes: The network device receives a second RV of the transport block from the terminal device, or the network device sends a second RV of the transport block to the terminal device, where the second RV is an RV in the M RVs. The first RV and the second RV are different, and a sending sequence of the first RV and the second RV satisfies a sequence relationship indicated by the sequence.

In this possible implementation, the network device may flexibly indicate a transmission sequence of RVs used when the TB is transmitted between the network device and the terminal device.

Optionally, in the sequence relationship indicated by the sequence of the M RVs, a quantity of overlapping mother code bits in two adjacent RVs is the smallest, and bit start positions of the two adjacent RVs are the farthest in the mother code obtained after transport block coding. Alternatively, in the sequence relationship indicated by the sequence of the M RVs, a quantity of overlapping mother code bits in two adjacent RVs is the smallest, and the overlapping mother code bits include a largest quantity of system information bits.

In this manner of determining an RV transmission sequence, overlapping information of RVs adjacent to each other in the transmission sequence may be reduced as much as possible, that is, a quantity of bits added to an RV in a current RV transmission compared with an RV in a previous transmission is maximized, so that a device that receives a TB may perform soft combination on all received RVs to obtain a better decoding gain.

In a possible implementation, the TBS configuration information is used to indicate a scaling factor of the transport block size, and the scaling factor is greater than 1. Alternatively, the TBS configuration information includes enabling information, and the enabling information is used to indicate whether to expand the transport block size. Optionally, when the enabling information is used to indicate to expand the transport block size, the enabling information is further used to indicate the scaling factor of the transport block size, where the scaling factor is greater than 1, or there is a correspondence between the scaling factor and a transmission parameter of the transport block. Alternatively, the network device sends third information to the terminal device, where the third information is used to indicate the scaling factor of the transport block size, and the scaling factor is greater than 1.

In this possible implementation, the network device can flexibly expand the TBS of the TB transmitted between the network device and the terminal device, so that the network device may transmit the TB by using the expanded TBS, thereby improving a spectral efficiency when the TB is transmitted.

According to a second aspect, an embodiment of this application provides a data transmission method. In the method, a terminal device receives first information from a network device, where the first information is used to indicate transport block size TBS configuration information and/or redundancy version RV configuration information, the TBS configuration information is used to configure a first transport block size TBS, and the RV configuration information is used to configure first RV information. In this way, the terminal device may send a transport block to the network device based on the TBS configuration information and/or the RV configuration information, or the terminal device receives a transport block from the network device based on the TBS configuration information and/or the RV configuration information, where a TBS of the transport block is the first TBS, and/or RV information of the transport block is the first RV information.

In a possible implementation, the first RV information includes at least one of the following information: a quantity M of RVs and start position information of the M RVs, where M is an integer greater than or equal to 1. In an example, a start position of each RV may be determined based on a length of the mother code obtained after transport block coding, and a number of the start position of the RV in start positions of the M RVs. For example, the start position of each RV is determined based on the length of the mother code obtained after transport block coding, a first parameter, and the number of the start position of the RV in the start positions of the M RVs, where the first parameter is used to determine a check matrix dimension corresponding to a coding scheme used by the transport block; or the start position of each RV is determined based on the length of the mother code obtained after transport block coding, M, the number of the start position of the RV in the start positions of the M RVs, and a preset bit offset.

In a possible implementation, the method further includes: The terminal device determines a sequence of the M RVs. Optionally, the terminal device receives second information from the network device, where the second information is used to indicate the sequence of the M RVs. Alternatively, the first RV information further includes the sequence of the M RVs.

In this implementation, that the terminal device sends a transport block to the network device based on the TBS configuration information and/or the RV configuration information, or that the terminal device receives a transport block from the network device based on the TBS configuration information and/or the RV configuration information includes: The terminal device sends a first RV of the transport block to the network device based on the TBS configuration information and/or the RV configuration information, or the terminal device receives a first RV of the transport block from the network device based on the TBS configuration information and/or the RV configuration information, where the first RV is an RV in the M RVs. Optionally, the method further includes: The terminal device sends a second RV of the transport block to the network device based on the TBS configuration information and/or the RV configuration information, or the terminal device receives a second RV of the transport block from the network device based on the TBS configuration information and/or the RV configuration information, where the second RV is an RV in the M RVs. The first RV and the second RV are different, and a sending sequence of the first RV and the second RV satisfies a sequence relationship indicated by the sequence.

Optionally, in the sequence relationship indicated by the sequence of the M RVs, a quantity of overlapping mother code bits in two adjacent RVs is the smallest, and bit start positions of the two adjacent RVs are the farthest in the mother code obtained after transport block coding. Alternatively, in the sequence relationship indicated by the sequence of the M RVs, a quantity of overlapping mother code bits in two adjacent RVs is the smallest, and the overlapping mother code bits include a largest quantity of system information bits.

In a possible implementation, the TBS configuration information is used to indicate a scaling factor of the transport block size, and the scaling factor is greater than 1. Alternatively, the TBS configuration information includes enabling information, and the enabling information is used to indicate whether to expand the transport block size. Optionally, when the enabling information is used to indicate to expand the transport block size, the enabling information is further used to indicate the scaling factor of the transport block size, where the scaling factor is greater than 1, or there is a correspondence between the scaling factor and a transmission parameter of the transport block. Alternatively, the terminal device receives third information from the network device, where the third information is used to indicate the scaling factor of the transport block size, and the scaling factor is greater than 1.

For beneficial effects of the data transmission method provided in the second aspect and the possible implementations of the second aspect, refer to the beneficial effects of the first aspect and the possible implementations of the first aspect. Details are not described herein again.

According to a third aspect, an embodiment of this application provides a communication apparatus. The communication apparatus in this embodiment may be the foregoing network device, or may be a chip used in a network device. The communication apparatus may be configured to perform actions of the network device in the foregoing method embodiment. The communication apparatus may include a sending module and a receiving module. Optionally, the communication apparatus may further include a processing module.

The sending module is configured to send first information to a terminal device, where the first information is used to indicate transport block size TBS configuration information and/or redundancy version RV configuration information, the TBS configuration information is used to configure a first transport block size TBS, and the RV configuration information is used to configure first RV information.

The receiving module is configured to receive a transport block from the terminal device, or the sending module is further configured to send a transport block to the terminal device, where a TBS of the transport block is the first TBS, and/or RV information of the transport block is the first RV information.

In a possible implementation, the first RV information includes at least one of the following information: a quantity M of RVs and start position information of the M RVs, where M is an integer greater than or equal to 1. In an example, a start position of each RV may be determined based on a length of the mother code obtained after transport block coding, and a number of the start position of the RV in start positions of the M RVs. For example, the start position of each RV is determined based on the length of the mother code obtained after transport block coding, a first parameter, and the number of the start position of the RV in the start positions of the M RVs, where the first parameter is used to determine a check matrix dimension corresponding to a coding scheme used by the transport block; or the start position of each RV is determined based on the length of the mother code obtained after transport block coding, M, the number of the start position of the RV in the start positions of the M RVs, and a preset bit offset.

In a possible implementation, the processing module is configured to determine a sequence of the M RVs. Optionally, the sending module is further configured to send second information to the terminal device, where the second information is used to indicate the sequence of the M RVs. Alternatively, the first RV information further includes the sequence of the M RVs.

In this implementation, the receiving module is specifically configured to receive a first RV of the transport block from the terminal device, or the sending module is specifically configured to send a first RV of the transport block to the terminal device, where the first RV is an RV in the M RVs. Optionally, the receiving module is further configured to receive a second RV of the transport block from the terminal device, or the sending module is further configured to send a second RV of the transport block to the terminal device, where the second RV is an RV in the M RVs. The first RV and the second RV are different, and a sending sequence of the first RV and the second RV satisfies a sequence relationship indicated by the sequence.

Optionally, in the sequence relationship indicated by the sequence of the M RVs, a quantity of overlapping mother code bits in two adjacent RVs is the smallest, and bit start positions of the two adjacent RVs are the farthest in the mother code obtained after transport block coding. Alternatively, in the sequence relationship indicated by the sequence of the M RVs, a quantity of overlapping mother code bits in two adjacent RVs is the smallest, and the overlapping mother code bits include a largest quantity of system information bits.

In a possible implementation, the TBS configuration information is used to indicate a scaling factor of the transport block size, and the scaling factor is greater than 1. Alternatively, the TBS configuration information includes enabling information, and the enabling information is used to indicate whether to expand the transport block size. Optionally, when the enabling information is used to indicate to expand the transport block size, the enabling information is further used to indicate the scaling factor of the transport block size, where the scaling factor is greater than 1, or there is a correspondence between the scaling factor and a transmission parameter of the transport block. Alternatively, the sending module is further configured to send third information to the terminal device, where the third information is used to indicate the scaling factor of the transport block size, and the scaling factor is greater than 1.

For beneficial effects of the communication apparatus provided in the third aspect and the possible implementations of the third aspect, refer to beneficial effects of the first aspect and the possible implementations of the first aspect. Details are not described herein again.

According to a fourth aspect, an embodiment of this application provides a communication apparatus. The communication apparatus in this embodiment may be the foregoing terminal device, or may be a chip used in a terminal device. The communication apparatus may be configured to perform actions of the terminal device in the foregoing method embodiment. The communication apparatus may include a receiving module and a sending module. Optionally, the communication apparatus may further include a processing module.

The receiving module is configured to receive first information from a network device, where the first information is used to indicate transport block size TBS configuration information and/or redundancy version RV configuration information, the TBS configuration information is used to configure a first transport block size TBS, and the RV configuration information is used to configure first RV information.

The sending module is configured to send a transport block to the network device based on the TBS configuration information and/or the RV configuration information, or the receiving module is further configured to receive a transport block from the network device based on the TBS configuration information and/or the RV configuration information, where a TBS of the transport block is the first TBS, and/or RV information of the transport block is the first RV information.

In a possible implementation, the first RV information includes at least one of the following information: a quantity M of RVs and start position information of the M RVs, where M is an integer greater than or equal to 1. In an example, a start position of each RV may be determined based on a length of the mother code obtained after transport block coding, and a number of the start position of the RV in start positions of the M RVs. For example, the start position of each RV is determined based on the length of the mother code obtained after transport block coding, a first parameter, and the number of the start position of the RV in the start positions of the M RVs, where the first parameter is used to determine a check matrix dimension corresponding to a coding scheme used by the transport block; or the start position of each RV is determined based on the length of the mother code obtained after transport block coding, M, the number of the start position of the RV in the start positions of the M RVs, and a preset bit offset.

In a possible implementation, the processing module is configured to determine a sequence of the M RVs. Optionally, the receiving module is further configured to receive second information from the network device, where the second information is used to indicate the sequence of the M RVs. Alternatively, the first RV information further includes the sequence of the M RVs.

In this implementation, the sending module is specifically configured to send a first RV of the transport block to the network device based on the TBS configuration information and/or the RV configuration information, or the receiving module is specifically configured to receive a first RV of the transport block from the network device based on the TBS configuration information and/or the RV configuration information, where the first RV is an RV in the M RVs. Optionally, the sending module is further configured to send a second RV of the transport block to the network device based on the TBS configuration information and/or the RV configuration information, or the receiving module is further configured to receive a second RV of the transport block from the network device based on the TBS configuration information and/or the RV configuration information, where the second RV is an RV in the M RVs. The first RV and the second RV are different, and a sending sequence of the first RV and the second RV satisfies a sequence relationship indicated by the sequence.

Optionally, in the sequence relationship indicated by the sequence of the M RVs, a quantity of overlapping mother code bits in two adjacent RVs is the smallest, and bit start positions of the two adjacent RVs are the farthest in the mother code obtained after transport block coding. Alternatively, in the sequence relationship indicated by the sequence of the M RVs, a quantity of overlapping mother code bits in two adjacent RVs is the smallest, and the overlapping mother code bits include a largest quantity of system information bits.

In a possible implementation, the TBS configuration information is used to indicate a scaling factor of the transport block size, and the scaling factor is greater than 1. Alternatively, the TBS configuration information includes enabling information, and the enabling information is used to indicate whether to expand the transport block size. Optionally, when the enabling information is used to indicate to expand the transport block size, the enabling information is further used to indicate the scaling factor of the transport block size, where the scaling factor is greater than 1, or there is a correspondence between the scaling factor and a transmission parameter of the transport block. Alternatively, the receiving module is further configured to receive third information from the network device, where the third information is used to indicate the scaling factor of the transport block size, and the scaling factor is greater than 1.

For beneficial effects of the communication apparatus provided in the fourth aspect and the possible implementations of the fourth aspect, refer to beneficial effects of the first aspect and the possible implementations of the first aspect. Details are not described herein again.

According to a fifth aspect, an embodiment of this application provides a communication apparatus. The communication apparatus includes a processor and a memory.

The memory is configured to store computer-executable program code, and the program code includes instructions. When the processor executes the instructions, the instructions enable the communication apparatus to perform the method according to any one of the first aspect or the possible implementations of the first aspect.

According to a sixth aspect, an embodiment of this application provides a communication apparatus. The communication apparatus includes a processor, a memory, a receiver, and a transmitter. The receiver and the transmitter are coupled to the processor. The processor controls a receiving action of the receiver, and controls a sending action of the transmitter.

The memory is configured to store computer-executable program code, and the program code includes instructions. When the processor executes the instructions, the instructions enable the communication apparatus to perform the method according to any one of the second aspect or the possible implementations of the second aspect.

According to a seventh aspect, an embodiment of this application provides a communication apparatus, including units, modules, or circuits configured to perform the method according to any one of the first aspect or the possible implementations of the first aspect. The communication apparatus may be a network device, or may be a module used in a network device, for example, a chip used in the network device.

According to an eighth aspect, an embodiment of this application provides a communication apparatus, including units, modules, or circuits configured to perform the method according to any one of the second aspect or the possible implementations of the second aspect. The communication apparatus may be a terminal device, or may be a module used in a terminal device, for example, a chip used in the terminal device.

According to a ninth aspect, an embodiment of this application provides a chip. The chip stores a computer program. When the computer program is executed by the chip, the method according to any one of the first aspect or the possible implementations of the first aspect is implemented.

According to a tenth aspect, an embodiment of this application provides a chip. The chip stores a computer program. When the computer program is executed by the chip, the method according to any one of the second aspect or the possible implementations of the second aspect is implemented.

According to an eleventh aspect, an embodiment of this application provides a computer program product including instructions. When the computer program product runs on a computer, the computer is enabled to perform the method according to any one of the first aspect or the possible implementations of the first aspect.

According to a twelfth aspect, an embodiment of this application provides a computer program product including instructions. When the computer program product runs on a computer, the computer is enabled to perform the method according to any one of the second aspect or the possible implementations of the second aspect.

According to a thirteenth aspect, an embodiment of this application provides a computer-readable storage medium.

The computer-readable storage medium stores instructions. When the instructions are run on a computer, the computer is enabled to perform the method according to any one of the first aspect or the possible implementations of the first aspect.

According to a fourteenth aspect, an embodiment of this application provides a computer-readable storage medium. The computer-readable storage medium stores instructions. When the instructions are run on a computer, the computer is enabled to perform the method according to any one of the second aspect or the possible implementations of the second aspect.

According to the data transmission method and the communication apparatus that are provided in the embodiments of this application, the network device may indicate the TBS configuration information and/or the RV configuration information to the terminal device by using the first information, and the network device may expand the TBS and/or refine the RV by using the TBS configuration information and/or the RV configuration information, so that the network device and the terminal device may transmit the TB by using the expanded TBS and/or the refined RV, thereby improving the spectral efficiency when the TB is transmitted.

DESCRIPTION OF EMBODIMENTS

Figure 1:
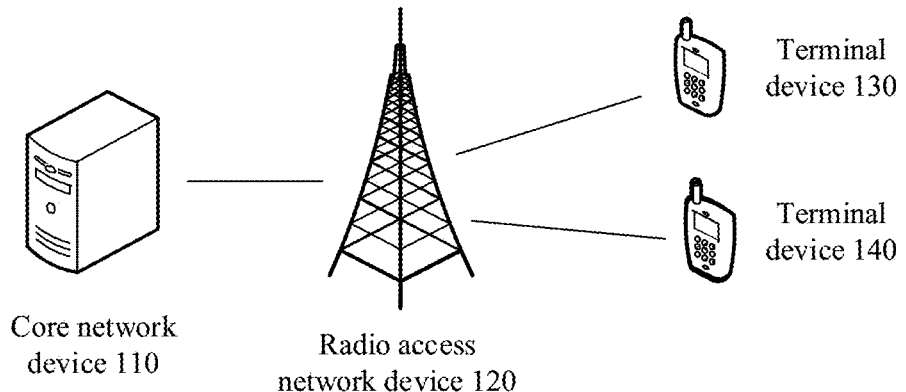
FIG. 1 is a schematic architectural diagram of a mobile communication system to which an embodiment of this application is applied.

FIG. 1 is a schematic architectural diagram of a mobile communication system to which an embodiment of this application is applied. As shown in FIG. 1, the mobile communication system may include a core network device 110, a radio access network device 120, and at least one terminal device (for example, a terminal device 130 and a terminal device 140 in FIG. 1). The terminal device is connected to the radio access network device 120 in a wireless manner, and the radio access network device 120 is connected to the core network device 110 in a wireless or wired manner. The core network device 110 and the radio access network device 120 may be different independent physical devices, or a function of the core network device 110 and a logic function of the radio access network device 120 may be integrated into one physical device, or a part of a function of the core network device 110 and a part of a function of the radio access network device 120 may be integrated into one physical device. The terminal device may be at a fixed position, or may be movable. FIG. 1 is only a schematic diagram. The mobile communication system may further include another network device, for example, may further include a wireless relay device and a wireless backhaul device, which are not shown in FIG. 1. A quantity of core network devices 110, a quantity of radio access network devices 120, and a quantity of terminal devices included in the mobile communication system are not limited in this embodiment of this application.

The radio access network device 120 is an access device that is connected to the mobile communication system by the terminal device in a wireless manner, and may be a NodeB, an evolved NodeB, a network side in a 5G mobile communication system or a new radio (new radio, NR) communication system, a network side in a future mobile communication system, an access node in a Wi-Fi system, or the like. A specific technology and a specific device form that are used by the radio access network device 120 are not limited in this embodiment of this application. In this embodiment of this application, the radio access network device 120 is referred to as a network device for short. Unless otherwise specified, in this embodiment of this application, the network device is the radio access network device 120. In addition, in this embodiment of this application, the terms 5G and NR may be equivalent.

The terminal device may also be referred to as a terminal Terminal, user equipment (UE), a mobile station (MS), a mobile terminal (MT), or the like. The terminal device may be a mobile phone (mobile phone), a tablet (pad), a computer having a wireless transceiver function, a virtual reality (VR) terminal device, an augmented reality (AR) terminal device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

The radio access network device 120 and the terminal device may be deployed on land, including an indoor device, an outdoor device, a handheld device, or a vehicle-mounted device; may be deployed on water; or may be deployed on an airplane, a balloon, and a satellite in the air. Application scenarios of the radio access network device 120 and the terminal device are not limited in this embodiment of this application.

The embodiments of this application are applicable to downlink data transmission, or are applicable to uplink data transmission, or are further applicable to device-to-device (D2D) data transmission. For the downlink data transmission, a sending device is the radio access network device 120, and a corresponding receiving device is the terminal device. For the uplink data transmission, a sending device is the terminal device, and a corresponding receiving device is the radio access network device 120. For the D2D data transmission, a sending device is the terminal device, and a corresponding receiving device is also the terminal device. A data transmission direction is not limited in the embodiments of this application.

Communication between the radio access network device 120 and the terminal device and communication between the terminal device and the terminal device may be performed by using a licensed spectrum (licensed spectrum), or an unlicensed spectrum (unlicensed spectrum), or both a licensed spectrum and an unlicensed spectrum. The radio access network device 120 and the terminal device may communicate with each other by using a spectrum below 6 gigahertzes (GHz), or may communicate with each other by using a spectrum above 6 GHz, or may communicate with each other by using both a spectrum below 6 GHz and a spectrum above 6 GHz. A spectrum resource used between the radio access network device 120 and the terminal device is not limited in this embodiment of this application.

For ease of understanding of the embodiments of this application, several definitions are first introduced and described. Details are as follows.

An uplink data channel is used to carry uplink data. For example, the uplink data channel is a physical uplink shared channel (PUSCH).

A downlink data channel is used to carry downlink data. For example, the downlink data channel is a physical downlink shared channel (PDSCH).

Data is transmitted on the uplink data channel and the downlink data channel in a form of a transport block (TB), where a size of the TB may be represented by a transport block size (TBS) expressed in bits.

For example, the mobile communication system is an NR system. Currently, in the NR system, the following manners are used to ensure transmission of TBs on the uplink data channel and the downlink data channel:

1. An adaptive modulation and coding (AMC) scheme is used to modulate and encode to-be-transmitted TBs on the uplink data channel and the downlink data channel, to select a proper modulation and coding scheme to adapt to radio channel quality and ensure transmission quality of a link.

2. Low density parity check coding (LDPC) is used to encode and decode to-be-transmitted TBs on the uplink data channel and the downlink data channel, to improve reliability of data transmission by increasing check bits.

3. A hybrid automatic repeat request (HARQ) technology is used to perform automatic retransmission and combined decoding on a TB that fails to be transmitted, to ensure correctness of data transmission.

The following uses the sending device and the receiving device as an example to describe a process of transmitting a TB in the NR system. It should be noted that when the sending device is a terminal device, the receiving device may be a network device; or when the sending device is a network device, the receiving device may be a terminal device.

Step 1: The sending device determines an initial transport block size (TBS) of a to-be-transmitted TB based on a quantity of scheduled resource units, a transmission code rate, a modulation scheme, and a quantity of spatial multiplexing layers. This may be specifically shown in the following formula (1):

$$N_{info} = N \cdot R \cdot Q_m \cdot v \quad (1), \text{where}$$

$N_{info}$ represents the initial TBS, and R represents the transmission code rate of a channel, where $0 < R < 1$;

$Q_m$ represents a quantity of bits that can be carried on one modulation symbol when the TB is modulated by using the modulation scheme. For example, a value of $Q_m$ is 1 when the modulation scheme is binary phase shift keying (BPSK), a value of $Q_m$ may be 2 when the modulation scheme is quadrature phase shift keying (QPSK), and a value of $Q_m$ may be 4 when the modulation scheme is 16 quadrature amplitude modulation (QAM);

v represents the quantity of spatial multiplexing layers. For example, it indicates single-layer transmission when a value of v is 1, and it indicates two-layer spatial multiplexing transmission when a value of v is 2; and N represents a quantity of resource units occupied when the TB is transmitted. The resource unit herein may be the minimum resource granularity unit for scheduling in the NR system, for example, a resource element (Resource Element, RE). For example, if the resource unit is the RE, N may be obtained through calculation by using the following formula (2):

$$N = N_{RB} \cdot (N_{SC} \cdot N_{sym} - N_{DM-RS} - N_{oh}) \quad (2), \text{where}$$

$N_{RB}$ represents a quantity of scheduled resource blocks (Resource Block, RB), $N_{SC}$ represents a quantity of subcarriers of each RB, $N_{sym}$ represents a quantity of symbols in one slot (slot), $N_{DM-RS}$ represents a quantity of REs occupied by a dedicated demodulation reference signal (dedicated modulation reference signal, DMRS) in the slot, and $N_{oh}$ represents overheads configured by a higher layer parameter.

Step 2: The sending device determines a TBS of the to-be-transmitted TB based on the determined initial TBS (that is, $N_{info}$).

Case 1: When $N_{info} \leq 3824$, the sending device may calculate an intermediate TBS (intermediate TBS) according to the following formula (3):

$$N_{info}^{in} = \max\left\{24, 2^n \left\lfloor \frac{N_{info}}{2^n} \right\rfloor \right\}, \quad (3)$$

where $N_{info}^{in}$ represents the intermediate TBS, and $n = \max\{3, \log_2 \lfloor N_{info} \rfloor - 6\}$.

Then, the sending device may use a TBS that is closest to $N_{info}^{in}$ and that is greater than or equal to $N_{info}^{in}$ the following Table 1 as the TBS of the to-be-transmitted TB. Table 1 shows a quantized value range of the TBS when $N_{info} \leq 3824$.

TABLE 1

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |

TABLE 1-continued

| Index | TBS |
|---|---|
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Case 2: When $3824 < N_{info} \leq 8424$, the sending device may calculate the intermediate TBS according to the following formula (4):

$$N_{info}^{in} = \max\left(3840, 2^n \times \text{round}\left(\frac{N_{info} - 24}{2^n}\right)\right), \quad (4)$$
$$n = \log_2 \lfloor N_{info} \rfloor - 5.$$

where

Then, the sending device may calculate the TBS of the to-be-transmitted TB according to the intermediate TBS (that is, $N_{info}^{in}$) and the following formula (5):

$$N_{info}^s = 8\left\lceil \frac{N_{info}^{in} + 24}{8} \right\rceil - 24, \quad (5)$$

where $N_{info}^s$ represents the TBS of the to-be-transmitted TB.

Case 3: When $N_{info} > 8424$, the sending device may calculate the intermediate TBS according to the following formula (6):

$$N_{info}^{in} = \max\left(3840, 2^n \times \text{round}\left(\frac{N_{info} - 24}{2^n}\right)\right), \quad (6)$$
$$n = \log_2 \lfloor N_{info} \rfloor - 5.$$

where

Then, the sending device may calculate the TBS of the to-be-transmitted TB according to the intermediate TBS (that is, $N_{info}^{in}$) and the following formula (7):

$$N_{info}^s = 8C\left\lceil \frac{N_{info}^{in} + 24}{8C} \right\rceil - 24 \quad (7)$$
$$C = \left\lceil \frac{N_{info}^{in} + 24}{8424} \right\rceil.$$

where

Step 3: To support different transmission code rates and TBSs, two different LDPC base graphs (BG) LDPC coding, that is, a BG 1 and a BG 2, are used in the NR system. Therefore, after determining the TBS of the to-be-transmitted TB, the sending device may determine, based on the transmission code rate and the TBS determined in step 2, by using a correspondence between a TBS and a BG type shown in Table 2, whether the TB needs to be segmented into a plurality of code blocks (CB). Corresponding LDPC BG 1 or BG 2 is performed on each CB obtained after the segmentation, to obtain a mother code obtained after the coding of each CB.

TABLE 2

| Transmission code rate $R_{init}$ | TBS ≤ 292 | 292 < TBS ≤ 3824 | TBS > 3824 |
|---|---|---|---|
| $R_{init} \leq 1/4$ | BG 2 | BG 2 | BG 2 |
| $1/4 < R_{init} \leq 2/3$ | BG 2 | BG 2 | BG 1 |
| $R_{init} \geq 2/3$ | BG 2 | BG 1 | BG 1 |

For example, when it is determined, based on the transmission code rate and the TBS determined in step 2, that LDPC coding BG 2 is used, if the TBS is less than or equal to 3824 bits, the TB does not need to be segmented. If the TBS is greater than 3824 bits, the TB needs to be segmented into a plurality of CBs. Alternatively, when it is determined, based on the transmission code rate and the TBS determined in step 1, that LDPC coding BG 1 is used, if the TBS is less than or equal to 8424 bits, the TB does not need to be segmented. If the TBS is greater than 8424 bits, the TB needs to be segmented into a plurality of CBs. In other words, limitations on CB sizes corresponding to different BGs are different, and are related to a transmission code rate and a TBS value range.

Step 4: A redundancy version (redundancy version, RV) of a coded mother code is bits of a specific length in the coded mother code, including some system information bits and some check information bits. In the current NR system, start positions of four RVs of a mother code obtained after LDPC coding and a transmission sequence of the four RVs are defined. The start positions of the RVs may be shown in the following Table 3, and the transmission sequence of the RVs is {0, 2, 3, 1}. The transmission sequence is used to represent the transmission sequence of each RV in a HARQ retransmission process. That is, an RV 0 is transmitted for the first time, an RV 2 is transmitted in the first retransmission, an RV 3 is transmitted in the second retransmission and an RV 4 is transmitted in the third retransmission.

TABLE 3

| $RV_{id}$ | $k_0$ | |
|---|---|---|
| | LDPC BG 1 | LDPC BG 2 |
| 0 | 0 | 0 |
| 1 | $\left\lfloor \frac{17 N_{cb}}{66 Z_c} \right\rfloor Z_c$ | $\left\lfloor \frac{13 N_{cb}}{50 Z_c} \right\rfloor Z_c$ |
| 2 | $\left\lfloor \frac{33 N_{cb}}{66 Z_c} \right\rfloor Z_c$ | $\left\lfloor \frac{25 N_{cb}}{50 Z_c} \right\rfloor Z_c$ |
| 3 | $\left\lfloor \frac{56 N_{cb}}{66 Z_c} \right\rfloor Z_c$ | $\left\lfloor \frac{43 N_{cb}}{50 Z_c} \right\rfloor Z_c$ |

$N_{cb}$ represents a length of the coded mother code written into a cyclic buffer, and $Z_c$ is used to determine a size of the LDPC check matrix dimension.

Therefore, after obtaining the mother codes obtained after the coding of the CBs, the sending device may perform, based on the foregoing RV transmission sequence and the start position of each RV, rate matching (for example, bit selection and interleaving coding) on the mother codes obtained after the coding of the CBs, to obtain a currently to-be-transmitted RV of each CB. The bit selection means that bits with a specific length (including a part of system information and check information) are selected from the coded mother code based on the start position of the currently to-be-transmitted RV as the currently to-be-transmitted RV of the CB. The specific length herein may be referred to as a length of an RV, and the length of the RV is greater than or equal to an interval between start positions of adjacent RVs. That is, the interval between the start positions of two adjacent RVs is a minimum granularity of the length of the RV. The interleaving coding refers to distributing information bits transmitted in time domain or frequency domain, or in both time domain and frequency domain, so that bursts of errors of a channel are spread in time, and a decoder can process these bursts of errors as random-like errors.

For example, if it is determined, based on the foregoing RV transmission sequence, that the currently to-be-transmitted RV is the RV 2, the sending device may select, from a start position of the RV2, bits of the length of the RV as the RV 2, and perform interleaving coding on the RV 2.

It may be understood that step 1 to step 3 are steps that need to be performed when the TB is transmitted for the first time, and step 1 to step 3 may not be performed again when the TB is retransmitted subsequently.

Step 5: The sending device combines the currently to-be-transmitted RV of each CB, to obtain a currently to-be-transmitted RV of the TB.

Step 6: The sending device performs processing such as scrambling and modulation on the currently to-be-transmitted RV of the TB, and sends the processed RV to the receiving device.

After receiving the RV of the TB, the receiving device performs corresponding processing such as demodulation, descrambling, and decoding on the RV of the TB. If the decoding is incorrect, the receiving device may send a negative acknowledgement (NACK) to the sending device, to indicate the sending device to perform HARQ retransmission on the TB.

Correspondingly, after receiving the NACK sent by the receiving device, the sending device may perform the HARQ retransmission on the TB. That is, the sending device performs step 4 to step 6 again to send a next RV adjacent to the RV in the transmission sequence to the receiving device based on the transmission sequence of the RV. The receiving device combines all the received RVs until the receiving device correctly decodes the TB. It may be understood that not all RVs shown in the transmission sequence are transmitted, and it may be specifically determined based on a decoding status of the TB by the receiving device.

For example, one TB is correctly decoded after being transmitted for three times. In this case, the sending device sends the RV 0 of the TB for the first time, including the RV 0 of each CB in the TB; sends the RV 2 of the TB for the second time, including the RV 2 of each CB in the TB; and sends the RV 3 of the TB for the third time, including the RV 3 of each CB in the TB. In this example, the RV 4 of the TB is not transmitted.

When the TB is transmitted in the foregoing manner, an equivalent transmission code rate of the TB may be shown in the following formula (8):

$$R = \frac{\text{system information bits}}{\text{system information bits} + \text{check information bits}}, \quad (8)$$

where
the system information bits are system information bits included in the RV of the transmitted TB, and the check information bits are check information bits included in the RV of the transmitted TB.

In a current technology, to ensure that demodulation and decoding can be correctly performed at a relatively high probability during an initial transmission, a smaller equivalent transmission code rate is used for transmitting the TB on an uplink data channel or a downlink data channel. A smaller equivalent transmission code rate indicates a larger quantity of transmitted system information bits and a lower spectral efficiency. In addition, the receiving device may correctly decode the TB only when a total quantity of bits obtained after combined transmissions exceeds a quantity of bits required for correct channel decoding. However, start positions of four RVs of a mother code obtained after LDPC coding are defined in the current NR system, where a distance between start positions of different RVs is relatively large. Consequently, a granularity of an RV transmitted each time is relatively large. Therefore, when a plurality of HARQ retransmissions are combined until the correct decoding of the TB, a total quantity of transmitted bits may be greater than a smallest quantity of bits required for correct decoding of a current channel, resulting in a relatively low spectral efficiency. In other words, the spectral efficiency is relatively low when the foregoing manner is used to transmit the TB.

Because of the foregoing problem, an embodiment of this application provides a data transmission method, to resolve the foregoing problem of the low spectral efficiency by expanding the TBS and/or refining the RV. It may be understood that the method in this embodiment of this application is applicable to, including but is not limited to the foregoing NR system, and may also be applicable to any mobile communication system in which the foregoing problem exists. Details are not described herein again.

The following describes the technical solutions in the embodiments of this application in detail by using some embodiments. The following several embodiments may be combined with each other, and a same or similar concept or process may not be described again in some embodiments.

Figure 2:
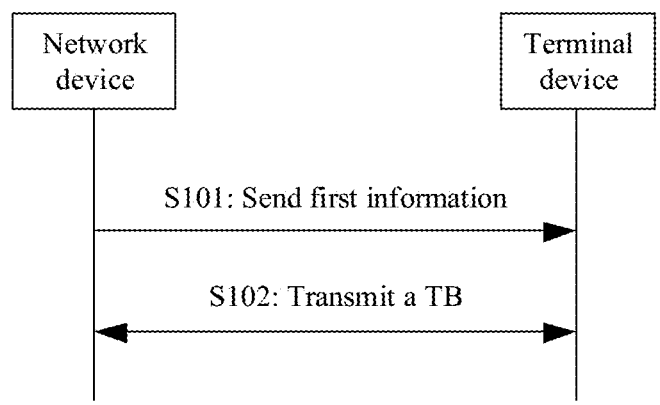
FIG. 2 is a schematic flowchart of a data transmission method according to an embodiment of this application.

FIG. 2 is a schematic flowchart of a data transmission method according to an embodiment of this application. As shown in FIG. 2, the method may include the following steps.

S100: A network device determines TBS configuration information and/or RV configuration information.

The TBS configuration information is used to configure a first TBS, and the RV configuration information is used to configure first RV information.

Alternatively, this step may be replaced with that the network device determines the first TBS and/or the first RV information.

The step S100 is optional.

S101: The network device sends first information to a terminal device. Correspondingly, the terminal device receives the first information.

The first information is used to indicate the TBS configuration information and/or the RV configuration information.

S1010: The terminal device determines the TBS configuration information and/or the RV configuration information, or the terminal device determines the first TBS and/or the first RV information. This step is optional. Specifically, the terminal device determines the TBS configuration information and/or the RV configuration information based on the first information, or the terminal device determines the first TBS and/or the first RV information based on the first information.

Optionally, the first information may be carried in first signaling, and the first signaling may be higher layer signaling or physical layer signaling. Alternatively, the first signaling is used to indicate the TBS configuration information and/or the RV configuration information.

The higher layer signaling herein may be, for example, radio resource control (Radio Resource Control, RRC) signaling or MAC signaling. When the first signaling is the physical layer signaling, the first signaling may be a physical downlink control channel (physical downlink control channel, PDCCH) carrying downlink control information (downlink control information, DCI), and the DCI includes one or more information fields used to indicate the TBS configuration information and/or the RV configuration information.

S102: The network device transmits a TB to the terminal device. Specifically, the network device sends the TB to the terminal device, or the network device receives the TB from the terminal device. Correspondingly, the terminal device receives the TB from the network device, or the terminal device sends the TB to the network device, where a TBS of the TB is the first TBS, and/or RV information of the TB is the first RV information.

S1021: The network device determines a first transport block TB. This step is optional. The first TB is the TB sent by the network device or the TB received from the terminal device in step S102. It should be noted herein that "first" herein does not specifically refer to a transport block or limit a transmission sequence of a transport block, and is merely used to clearly describe a transmission process. For ease of description, the first TB may be referred to as a TB for short.

S1022: The terminal device determines the first TB. This step is optional.

It should be noted that the sequence numbers of the foregoing steps do not represent an actual execution sequence.

When the network device is a sending device and the terminal device is a receiving device, the network device may send the TB to the terminal device based on the first TBS and/or the first RV information. When the network device is a receiving device and the terminal device is a sending device, the terminal device may send the TB to the network device based on the first TBS and/or the first RV information.

Optionally, the first information is used to indicate the RV configuration information, and the RV configuration information is used to configure the first RV information. In a possible implementation, the first RV information may include at least one of the following information: a quantity M of RVs and start position information of the M RVs, where M is an integer greater than or equal to 1. For example, a value of M may be any one of 2, 4, 6, 8, 16, 32, and the like. A smaller value of M indicates a larger interval between start positions of two adjacent RVs, and a larger minimum threshold of a length of the RV/a larger minimum value of a length of the RV (which may also be referred to as a larger minimum granularity of the length of the RV). A larger value of M indicates a smaller interval between start positions of two adjacent RVs, and a smaller minimum threshold of a length of the RV/a smaller minimum value of a length of the RV (which may also be referred to as a smaller minimum granularity of the length of the RV). That is, the RV is more refined. Therefore, the RV with a value of M greater than 4 or greater than a specific value may also be referred to as a refined RV, and the specific value may be predefined or configured. During specific implementation, the value of M may be specifically set based on a requirement of the mobile communication system. For example, when a strict requirement on a transmission latency is required, M with a relatively small value (for example, 2 or 4) may be selected, to reduce a quantity of times of retransmissions of the TB. When a relatively high spectrum resource efficiency is required, M with a relatively large value (for example, 6, 8, 16, or 32) may be selected. Optionally, in some embodiments, when channel state information (channel state information, CSI) feedback is inaccurate or a CSI feedback granularity is relatively coarse, for example, when a channel quality indicator (channel quality indicator, CQI) of a configured wideband fed back by the CSI is inaccurate or the granularity is relatively coarse, M with a relatively large value (for example, a value greater than 4) may be selected.

The start position of each RV may be determined based on a length of the mother code obtained after TB coding, and a number of the start position of the RV in start positions of the M RVs.

For example, the start position of each RV may be determined based on the length of the mother code obtained after TB coding, a first parameter, and the number of the start position of the RV in the start positions of the M RVs. The first parameter herein is used to determine a check matrix dimension corresponding to a coding scheme used by the TB, for example, $Z_c$ in Table 1. An example in which the first parameter is $Z_c$ is used for description in the following embodiments. It may be understood that, when the TB is segmented into a plurality of CBs, the quantity M of RVs and the start position information of the M RVs are a quantity of RVs of each CB in the TB and the start position information of the RVs.

For example, when the value of M is 8, all start positions of RVs in original four RVs may respectively correspond to start positions of RVs whose $Rv_{id}$ numbers are 0, 2, 4, and 6 in eight RVs. However, start positions of RVs whose $Rv_{id}$ numbers are 1, 3, 5, and 7 are located in a start interval of two RVs adjacent to the front and back of the RV. For example, the start position of the RV whose $Rv_{id}$ number is 1 may be an intermediate value between the start position of the RV whose $Rv_{id}$ number is 0 and the start position of the RV whose $Rv_{id}$ number is 2; the start position of the RV whose $Rv_{id}$ number is 3 may be an intermediate value between the start position of the RV whose $Rv_{id}$ number is 2 and the start position of the RV whose $Rv_{id}$ number is 4; the start position of the RV whose $Rv_{id}$ number is 5 may be an intermediate value between the start position of the RV whose $Rv_{id}$ number is 4 and the start position of the RV whose $Rv_{id}$ number is 6; and the start position of the RV whose $Rv_{id}$ number is 7 may be an intermediate value between the start position of the RV whose $Rv_{id}$ number is 6 and the start position of the RV whose $Rv_{id}$ number is 0.

The following table lists configuration of the start position information of the eight RVs

TABLE 4

| $RV_{id}$ | $k_0$ | |
| --- | --- | --- |
| | LDPC BG 1 | LDPC BG 2 |
| 0 | 0 | 0 |
| 1 | $\lfloor \frac{9N_{cb}}{66Z_c} \rfloor Z_c$ | $\lfloor \frac{6N_{cb}}{50Z_c} \rfloor Z_c$ |
| 2 | $\lfloor \frac{17N_{cb}}{66Z_c} \rfloor Z_c$ | $\lfloor \frac{13N_{cb}}{50Z_c} \rfloor Z_c$ |
| 3 | $\lfloor \frac{25N_{cb}}{66Z_c} \rfloor Z_c$ | $\lfloor \frac{19N_{cb}}{50Z_c} \rfloor Z_c$ |
| 4 | $\lfloor \frac{33N_{cb}}{66Z_c} \rfloor Z_c$ | $\lfloor \frac{25N_{cb}}{50Z_c} \rfloor Z_c$ |
| 5 | $\lfloor \frac{44N_{cb}}{66Z_c} \rfloor Z_c$ | $\lfloor \frac{34N_{cb}}{50Z_c} \rfloor Z_c$ |
| 6 | $\lfloor \frac{56N_{cb}}{66Z_c} \rfloor Z_c$ | $\lfloor \frac{43N_{cb}}{50Z_c} \rfloor Z_c$ |
| 7 | $\lfloor \frac{61N_{cb}}{66Z_c} \rfloor Z_c$ | $\lfloor \frac{47N_{cb}}{50Z_c} \rfloor Z_c$ |

For example, when the value of M is 16, all start positions of RVs in the original four RVs may respectively correspond to start positions of RVs whose $Rv_{id}$ numbers are 0, 4, 8, and 12 in 16 RVs. Start positions of RVs whose $Rv_{id}$ numbers are 1, 2, and 3 may be located in a start interval between a start position of the RV whose $Rv_{id}$ number is 0 and a start position of the RV whose $Rv_{id}$ number is 4. For example, the start positions of RVs whose $Rv_{id}$ numbers are 1, 2, and 3 may respectively correspond to one quarter point of the start interval between the start position of the RV whose $Rv_{id}$ number is 0 and the start position of the RV whose $Rv_{id}$ number is 4. Start positions of RVs whose $Rv_{id}$ numbers are 5, 6, and 7 may be located in a start interval between a start position of the RV whose $Rv_{id}$ number is 4 and a start position of the RV whose $Rv_{id}$ number is 8. For example, the start positions of RVs whose $Rv_{id}$ numbers are 5, 6, and 7 may respectively correspond to one quarter point of the start interval between the start position of the RV whose $Rv_{id}$ number is 4 and the start position of the RV whose $Rv_{id}$ number is 8. Start positions of RVs whose $Rv_{id}$ numbers are 9, 10, and 11 may be located in a start interval between a start position of the RV whose $Rv_{id}$ number is 8 and a start position of the RV whose $Rv_{id}$ number is 12. For example, the start positions of RVs whose $Rv_{id}$ numbers are 9, 10, and 11 may respectively correspond to one quarter point of the start interval between the start position of the RV whose $Rv_{id}$ number is 8 and the start position of the RV whose $Rv_{id}$ number is 12. Start positions of RVs whose $Rv_{id}$ numbers are 13, 14, and 15 may be located in a start interval between a start position of the RV whose $Rv_{id}$ number is 12 and a start position of the RV whose $Rv_{id}$ number is 0. For example, the start positions of RVs whose $Rv_{id}$ numbers are 13, 14, and 15 may respectively correspond to one quarter point of the start interval between the start position of the RV whose $Rv_{id}$ number is 12 and the start position of the RV whose $Rv_{id}$ number is 0.

The following table lists configuration of the start position information of the 16 RVs.

TABLE 5

| $RV_{id}$ | $k_0$ | |
| --- | --- | --- |
| | LDPC BG 1 | LDPC BG 2 |
| 0 | 0 | 0 |
| 1 | $\lfloor \frac{4N_{cb}}{66Z_c} \rfloor Z_c$ | $\lfloor \frac{6N_{cb}}{50Z_c} \rfloor Z_c$ |
| 2 | $\lfloor \frac{9N_{cb}}{66Z_c} \rfloor Z_c$ | $\lfloor \frac{6N_{cb}}{50Z_c} \rfloor Z_c$ |
| 3 | $\lfloor \frac{13N_{cb}}{66Z_c} \rfloor Z_c$ | $\lfloor \frac{9N_{cb}}{50Z_c} \rfloor Z_c$ |
| 4 | $\lfloor \frac{17N_{cb}}{66Z_c} \rfloor Z_c$ | $\lfloor \frac{13N_{cb}}{50Z_c} \rfloor Z_c$ |
| 5 | $\lfloor \frac{21N_{cb}}{66Z_c} \rfloor Z_c$ | $\lfloor \frac{16N_{cb}}{50Z_c} \rfloor Z_c$ |
| 6 | $\lfloor \frac{25N_{cb}}{66Z_c} \rfloor Z_c$ | $\lfloor \frac{19N_{cb}}{50Z_c} \rfloor Z_c$ |
| 7 | $\lfloor \frac{29N_{cb}}{66Z_c} \rfloor Z_c$ | $\lfloor \frac{22N_{cb}}{50Z_c} \rfloor Z_c$ |
| 8 | $\lfloor \frac{33N_{cb}}{66Z_c} \rfloor Z_c$ | $\lfloor \frac{25N_{cb}}{50Z_c} \rfloor Z_c$ |
| 9 | $\lfloor \frac{39N_{cb}}{66Z_c} \rfloor Z_c$ | $\lfloor \frac{29N_{cb}}{50Z_c} \rfloor Z_c$ |
| 10 | $\lfloor \frac{44N_{cb}}{66Z_c} \rfloor Z_c$ | $\lfloor \frac{34N_{cb}}{50Z_c} \rfloor Z_c$ |
| 11 | $\lfloor \frac{50N_{cb}}{66Z_c} \rfloor Z_c$ | $\lfloor \frac{38N_{cb}}{50Z_c} \rfloor Z_c$ |
| 12 | $\lfloor \frac{56N_{cb}}{66Z_c} \rfloor Z_c$ | $\lfloor \frac{43N_{cb}}{50Z_c} \rfloor Z_c$ |
| 13 | $\lfloor \frac{59N_{cb}}{66Z_c} \rfloor Z_c$ | $\lfloor \frac{45N_{cb}}{50Z_c} \rfloor Z_c$ |

TABLE 5-continued

| $RV_{id}$ | $k_0$ | |
|---|---|---|
| | LDPC BG 1 | LDPC BG 2 |
| 14 | $\left\lfloor \frac{61N_{cb}}{66Z_c} \right\rfloor Z_c$ | $\left\lfloor \frac{47N_{cb}}{50Z_c} \right\rfloor Z_c$ |
| 15 | $\left\lfloor \frac{64N_{cb}}{66Z_c} \right\rfloor Z_c$ | $\left\lfloor \frac{49N_{cb}}{50Z_c} \right\rfloor Z_c$ |

It can be learned from Table 4 and Table 5 that, a larger value of M indicates more refined and more even segmentation performed on the coded mother code at the start positions of the M RVs.

For another example, the start position of each RV is determined based on the length of the mother code obtained after TB coding, M, the number of the start position of the RV in the start positions of the M RVs, and a preset bit offset. It may be understood that, when the TB is segmented into a plurality of CBs, the quantity M of RVs and the start position information of the M RVs are a quantity of RVs of each CB in the TB and the start position information of the RVs.

For example, the start position of each RV may be calculated according to the following formula (9), specifically:

$$k_0^{(i)} = \left\lfloor \frac{L}{M} \right\rfloor \cdot RV^{(i)} + a, \tag{9}$$

where
$k_0^{(i)}$ represents the start position of the $i^{th}$ RV, L represents a length the coded mother code, $RV^{(i)}$ represents a number of the $i^{th}$ RV, satisfying $RV^{(i)} \in \{0, 1, 2, \ldots, M-1\}$, a represents a position offset of a constant, and a default value may be, for example, 2.

Optionally, the RV configuration information is used to indicate the quantity M of RVs, and the RV configuration information may indicate M, for example, by carrying the value of M, or by using an index used to represent the value of M. Still optionally, the RV configuration information is used to indicate start position information of the M RVs, and the RV configuration information may indicate the start position information of the M RVs, for example, by carrying an index used to represent the start position of each RV, or indicate the start position information of the M RVs by carrying an index of a table used to represent the start position information of the M RVs. It should be noted that the RV configuration information may be used to indicate at least one of the quantity M of RVs and the start position information of M RVs, or another manner may be used for indication. This is not limited.

It should be noted that, when the RV configuration information is used to indicate only the quantity M of RVs, the start position information of the M RVs may be preset on the network device and the terminal device, or may be calculated by the network device and the terminal device according to, for example, the foregoing formula (9). This is not limited.

In addition, in the foregoing implementation, a sequence of the M RVs may be preconfigured or stored on the network device and the terminal device, or may be indicated by the network device to the terminal device by using the RV configuration information (that is, the first RV information may further include the sequence of the M RVs), or may be indicated by the network device to the terminal device by using second information. The second information may be carried in first signaling, or may be carried in second signaling other than the first signaling. The second signaling may be higher layer signaling or physical layer signaling. In other words, the second signaling is used to indicate the sequence of the M RVs. For a description of the higher layer signaling, refer to the foregoing description of the first signaling.

During specific implementation, the RV configuration information may indicate the sequence of the M RVs, or the like by carrying a transmission sequence of the M RVs, or by carrying an index used to indicate a transmission sequence of the M RVs. This is not limited.

The sequence of the M RVs described herein is used to indicate the transmission sequence of the M RVs in a HARQ process. For example, the network device is a sending device and the terminal device is a receiving device. In a process in which the network device transmits the TB to the terminal device, if the network device sends one of the M RVs of the TB to the terminal device, it is assumed that the RV is a first RV. In this case, if the TB is not correctly decoded by the terminal device, the network device may retransmit a next RV adjacent to the first RV in the transmission sequence to the terminal device, and it is assumed that the next RV is a second RV. In other words, the second RV is one of the M RVs, the second RV and the first RV are different, and a sending sequence of the first RV and the second RV satisfies a sequence relationship indicated by the sequence of the M RVs. On the contrary, when the network device is a receiving device and the terminal device is a sending device, the RV of the TB sent by the terminal device to the network device also satisfies a sequence relationship indicated by the sequence of the M RVs. Details are not described herein again. It may be understood that a meaning of the sequence relationship is the same as that of the transmission sequence. This is not distinguished.

The transmission sequence (which may also be referred to as the sequence relationship) indicated by the sequence of the M RVs may be a transmission sequence determined based on a link simulation result, or may be a transmission sequence determined by the network device based on the following principles:

In the sequence relationship indicated by the sequence of the M RVs, a quantity of overlapping mother code bits in two adjacent RVs is the smallest, and bit start positions of the two adjacent RVs are the farthest in the coded mother code; or in the sequence relationship indicated by the sequence of the M RVs, a quantity of overlapping mother code bits in two adjacent RVs is the smallest, and the overlapping mother code bits include a largest quantity of system information bits.

The foregoing principles may be expressed by using the following formula (10) to formula (12):

$$RV^{(i)} = \arg\min\ sub(\mathfrak{t}^{(i)}, \Lambda^{(i-1)}) \tag{10}$$

where $\Lambda^{(i-1)} = \{k_0^{(i-1)}, k_1^{(i-1)}, \ldots, k_{L_{rv}-1}^{(i-1)}\}$, indicating positions of all $L_{rv}$ bits of the $RV^{(i-1)}$ in the coded bits, satisfying that a position of $l^{th}$ bit is $k_l^{(i-1)} = \mathrm{mod}(k_0^{(i-1)} + l, L)$; $L_{rv}$ represents the quantity of bits included in the $RV^{(i-1)}$, that is, a length of $RV^{(i-1)}$; l represents the $l^{th}$ bit, and $k_0^{(i-1)} + l$ represents a position of the $l^{th}$ bit; and L represents the length of the coded mother code, and mod ( ) is used to ensure that when the position of the $l^{th}$ bit of the $RV^{(i-1)}$ exceeds the length of the coded mother code, a cyclic shift may be performed again from a start position of the coded mother code.

Sub $(\Lambda^{(i)}, \Lambda^{(i-1)})$ represents a quantity of elements that $\Lambda^{(i)}$ overlaps with $\Lambda^{(i-1)}$. If there are a plurality of $RV^{(i)}$ values that meet a same condition sub$(\Lambda^{(i)}, \Lambda^{(i-1)})$, the values are defined as a set RV={$RV^{(i_1)}, RV^{(i_2)}, \ldots, RV^{(i_3)}$}, and one RV may be selected from the RV set. A selection method includes but is not limited to the following two manners:

Selection manner 1: An RV with the farthest distance is selected, as shown in the following formula (11):

$$RV^{(i)} = \arg\max_{i \in \{i_1, i_2, \ldots, i_K\}} |RV^{(i)} - RV^{(i-1)}| \quad (11)$$

Selection manner 2: An RV including a largest quantity of system information bits is selected, as shown in the following formula (12):

$$RV^{(i)} = \arg\max_{i \in \{i_1, i_2, \ldots, i_K\}} \{\text{NumSymBit}(RV^{(i)})\} \quad (12),$$

where NumSysBit(•) represents a quantity of system information bits included in the RV.

That the value of M is 8 is used as an example. If the TBS is 1000 bits, the length of the coded mother code is 3000 bits, a transmission code rate is 0.75, and the start position of $RV^{(i)}$ is initialized as $k_0^{(0)}=2$, the subsequent start position of the RV and the sequence relationship of the RV may be shown in the following Table 6:

TABLE 6

| $RV^{(i)}$ | 0 | 4 | 7 | 3 | 6 | 2 | 5 | 1 |
|---|---|---|---|---|---|---|---|---|
| $k_0^{(i)}$ | 2 | 1502 | 2627 | 1127 | 2252 | 752 | 1877 | 377 |

In this manner of determining an RV transmission sequence, overlapping information of RVs adjacent to each other in the transmission sequence may be reduced as much as possible, that is, a quantity of check bits added to an RV in a current RV transmission compared with an RV in a previous transmission is maximized, so that a device that receives a TB may perform soft combination on all received RVs to obtain a better decoding gain.

The following describes, by using a specific example, how to improve a spectral efficiency by using a refined RV. Details are as follows.

Figure 3:
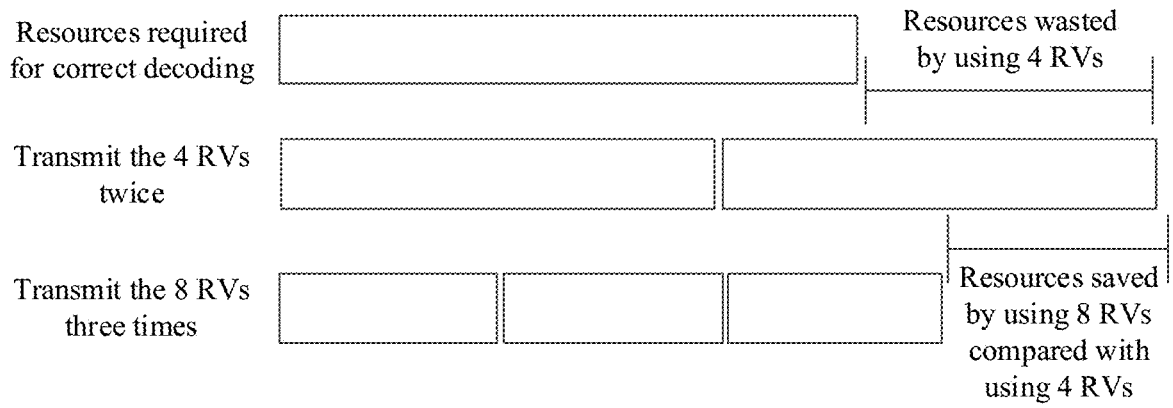
FIG. 3 is a schematic diagram of a spectrum resource according to an embodiment of this application.

FIG. 3 is a schematic diagram of a spectrum resource according to an embodiment of this application. As shown in FIG. 3, if a TBS is 700 bits, a quantity of bits required for correct decoding under a current channel condition is 1000, and a quantity of bits of a mother code obtained after LDPC coding is 3000.

Using existing 4 RVs as an example, that is, a value of M is 4. An interval between start positions of two adjacent RVs is approximately equal to 750 bits (that is, a quotient of the quantity of bits of the coded mother code and M). To ensure that all RVs can traverse all bit positions of the coded mother code, a minimum length of the RV is 750 bits. A quantity of bits required for correct decoding under the current channel condition is 1000. In other words, two RVs need to be transmitted for correct decoding. In this scenario, a total quantity of transmitted bits used when a TB is transmitted is 1500 bits, and 500 bits of spectrum resources are wasted.

If 8 RVs that are more refined than 4 RVs are used, an interval between start positions of two adjacent RVs is 375 bits. To ensure that all RVs can traverse all bit positions of the coded mother code, the minimum length of the RV is 375 bits. In this scenario, three RVs need to be transmitted for correct decoding, the total quantity of transmitted bits used when the TB is transmitted is 1125 bits, and 125 bits of spectrum resources are wasted.

It can be learned from the foregoing example that, if a start position of a more refined RV is set, a granularity of the RV in a single transmission may be smaller, and RVs in a plurality of HARQ transmissions can be more accurately close to a minimum quantity of resources required for correct decoding, so that a bearer capability of a current channel can be more accurately adapted, waste of resources during the correct decoding is reduced, and the spectral efficiency is improved.

The foregoing embodiments describe how to improve the spectral efficiency when the TB is transmitted based on the RV configuration information indicated by the first information. The following describes how to improve the spectral efficiency when the TB is transmitted based on TBS configuration information indicated by the first information. Details are as follows.

In this embodiment, a first TBS configured by the TBS configuration information may be an expanded TBS, or may be an unexpanded TBS. The unexpanded TBS herein may be a TBS determined by calculating a TBS in a current technology, for example, the TBS determined in step 1 and step 2 in the description of an existing process of transmitting the TB in the NR system in the foregoing method embodiments. The expanded TBS is greater than the unexpanded TBS. Compared with the unexpanded TBS, the expanded TBS is used for transmitting the TB, so that more system information bits can be transmitted on a same resource unit. Therefore, an equivalent transmission code rate of the TB can be increased, and even exceeds 1.0, thereby improving the spectral efficiency.

In a possible implementation, the TBS configuration information may include enabling information, and the enabling information is used to indicate whether to expand the transport block size. That is, the transport block size is enabled to be expanded or to be not expanded. When the enabling information is used to indicate to expand the transport block size, the first TBS is the expanded TBS. In other words, the network device may use the expanded TBS to transmit the TB. When the enabling information is used to indicate not to expand the transport block size, the first TBS is the unexpanded TBS. The network device may transmit the TB by using the TBS determined in step 1 and step 2 in the description of the existing process of transmitting the TB in the NR system in the foregoing method embodiments.

In another possible implementation, the TBS configuration information may indirectly indicate, by using whether to indicate a scaling factor of the transport block size, whether to expand the transport block size. For example, when the TBS configuration information indicates the scaling factor of the transport block size, and the scaling factor is greater than 1, the first TBS is the expanded TBS. In other words, the network device may use the expanded TBS to transmit the TB. When the TBS configuration information does not indicate the scaling factor of the transport block size, or a value of the indicated scaling factor of the transport block size is 1, the first TBS is the unexpanded TBS, and the network device may transmit the TB by using the TBS determined in step 1 and step 2 in the description of the existing process of transmitting the TB in the NR system in the foregoing method embodiments.

It may be understood that when the first TBS indicated by the TBS configuration information is the unexpanded TBS, the network device and the terminal device may determine the first TBS based on the manners shown in step 1 and step 2 in the description of the existing process of transmitting the TB in the NR system in the foregoing method embodiments.

The following mainly describes how the network device and the terminal device determine the first TBS when the first TBS configured by the TBS configuration information is the expanded TBS.

When the TBS configuration information indirectly indicates a size of the expanded transport block by using the indicated scaling factor of the transport block size, the value of the first TBS may be directly determined based on the indicated scaling factor of the transport block size. For descriptions of a scaling factor β and how to calculate the value of the first TBS based on the scaling factor β of the transport block, refer to subsequent descriptions.

When the TBS configuration information indicates to expand the transport block size by using the enabling information, the value of the first TBS may be determined in the following several manners.

Manner 1: The value of the first TBS is a predefined value.

Manner 2: The value of the first TBS may be a value determined based on the scaling factor β of the transport block size. The scaling factor β may be greater than 1. The following describes how to determine the value of the first TBS based on the scaling factor β of the transport block size.

A sending device may determine an initially expanded TBS based on a quantity of scheduled resource units, a transmission code rate, a modulation scheme, a quantity of spatial multiplexing layers, and the scaling factor β. Details may be shown in the following formula (13):

$$N_{info}' = N \cdot R \cdot Q_m \cdot v \cdot \beta \quad (13), \text{where}$$

$N_{info}'$ represents the initially expanded TBS. For descriptions of another parameter, refer to the descriptions of the parameter in the foregoing formula (1). Meanings of the parameter are the same. Details are not described again.

Then, the sending device may determine the first TBS based on the determined initially expanded TBS (that is, $N_{info}'$). For how to determine the first TBS based on the initially expanded TBS, refer to the manner of determining the TBS based on the initial TBS shown in step 2 in the description of the existing process of transmitting the TB in the NR system in the foregoing method embodiments. Details are not described herein again.

It may be understood that the scaling factor β of the transport block size may be a predefined β, or may be a scaling factor determined based on a transmission parameter of the TB. The transmission parameter herein may be, for example, a modulation and coding scheme (MCS). In this implementation, a mapping relationship between the transmission parameter and the scaling factor β of the transport block size is preset on the network device and the terminal device. The mapping relationship between the transmission parameter and the scaling factor β of the transport block size may be shown in the following Table 7:

TABLE 7

| Transmission parameter | Value of β |
|---|---|
| Transmission parameter 1 | β1 |
| Transmission parameter 2 | β2 |
| Transmission parameter 3 | β3 |
| ... | ... |
| Transmission parameter x | βx |

A manner in which the terminal device obtains the transmission parameter of the TB is not limited in this embodiment of this application. For example, the network device may indicate the transmission parameter of the TB to the terminal device in an existing manner. Details are not described herein again.

Optionally, the scaling factor β of the transport block size may also be indicated by the network device to the terminal device. For example, the network device indicates the scaling factor β of the transport block size by using the enabling information, or the network device indicates the scaling factor β of the transport block size by using another field in the TBS configuration information, or the network device indicates the scaling factor β of the transport block size by using third information. The third information described herein may be carried in first signaling, or may be carried in third signaling other than the first signaling. The third signaling may be higher layer signaling or physical layer signaling. In other words, the third signaling is used to indicate the scaling factor β. For a description of the higher layer signaling, refer to the foregoing description of the first signaling. For example, the third signaling may be signaling that carries downlink control information (downlink control information, DCI), or the third information may be carried in the DCI.

It may be understood that, if the enabling information is used to indicate not to expand the transport block size, that is, the transport block size is not enabled to be expanded, and even if the network device indicates the scaling factor β of the transport block size to the terminal device in any one of the foregoing manners, the network device and the terminal device still use the unexpanded TBS for transmission of the TB.

A value of the scaling factor β of the transport block size is not limited in this embodiment, and the value of the scaling factor β of the transport block size may be of an integer type or a decimal type. When the value of the scaling factor β of the transport block size is of the integer type, the scaling factor β of the transport block size may be used to expand the initial TBS by an integer multiple. When a value of the scaling factor β of the transport block size is of the decimal type, the scaling factor β of the transport block size may be used to expand the initial TBS by a decimal multiple. Therefore, the integer-type scaling factor may also be referred to as a radical-type scaling factor, and the decimal-type scaling factor may also be referred to as a moderate-type scaling factor.

For example, the expanded TBS may enable the equivalent transmission code rate of the TB to be greater than or equal to 1. In this case, when the value of the scaling factor β of the transport block size is of the integer type, the value of the scaling factor β of the transport block size may be shown in the following formula (14).

$$\beta = \arg \min\{\beta \cdot R \geq 1, \beta \in Z^+\} \quad (14)$$

In this implementation, the value of the scaling factor β of the transport block size may be, for example, any one of 2, 3, 4, 5, and the like.

When the scaling factor β of the transport block size is indicated by the network device by using the TBS configuration information, or is indicated by using the enabling information, or is indicated by the network device by using the third information, the network device may indicate the scaling factor β of the transport block size by using the following field that occupies two bits. When the third information is carried in the DCI, the field may be a scaling factor field in the DCI.

A correspondence between a value of the field and the scaling factor β of the transport block size may be shown in the following Table 8:

TABLE 8

| Field | Value of β |
|---|---|
| 00 | 2 |
| 01 | 3 |
| 10 | 4 |
| 11 | 5 |

For example, the value of the scaling factor β of the transport block size is less than 2, and the expanded TBS may enable the equivalent transmission code rate of the TB to be greater than or equal to 1. When the value of the scaling factor β of the transport block size is of the decimal type, the value of the scaling factor β of the transport block size may be shown in the following formula (15):

$$\beta = \arg\min\{\beta \cdot R \geq 1, \beta \in \{1.2, 1.4, 1.6, 1.8\}\} \quad (15)$$

For example, the value of the scaling factor β of the transport block size is less than 2. When the scaling factor β of the transport block size is indicated by the network device by using the TBS configuration information, or is indicated by using the enabling information, or is indicated by the network device by using the third information, the network device may indicate the scaling factor β of the transport block size by using the following field that occupies two bits. When the third information is carried in the DCI, the field may be a scaling factor field in the DCI.

A correspondence between a value of the field and the scaling factor β of the transport block size may be shown in the following Table 9:

TABLE 9

| Field | Value of β |
|---|---|
| 00 | 1.2 |
| 01 | 1.4 |
| 10 | 1.6 |
| 11 | 1.8 |

It may be understood that, although the foregoing examples are all described by using an example in which the value of the scaling factor β of the transport block size is directly indicated, a person skilled in the art may understand that the value of the scaling factor β of the transport block size may also be indirectly indicated by using an index corresponding to the value of the scaling factor β of the transport block size. Implementations thereof are similar. Details are not described herein again.

In addition, when the scaling factor β of the transport block size has a plurality of values, for example, a proper value may be selected based on the current channel condition, and a requirement on the spectral efficiency, to appropriately expand the TBS, thereby ensuring accuracy of TBS scaling.

According to the foregoing TBS scaling method, the equivalent transmission code rate of the TB can be increased when a current LDPC coding requirement of a data channel in current NR is met, so that the equivalent transmission code rate can even be greater than 1.0, thereby improving the spectral efficiency of data transmission.

It may be understood that, when the first information is used to indicate the TBS configuration information and the RV configuration information, the expanded TBS and a refined RV may be used in combination. That is, the expanded TBS may be first determined based on the TBS configuration information, and then the data transmission is performed by using M with a relatively large value and by using a more refined RV, to further improve the spectral efficiency of the data transmission. For an implementation thereof, refer to the foregoing respective descriptions. Details are not described herein again.

It should be noted that, the foregoing expanded TBS and/or the refined RV are two relatively independent solutions. That is, both the foregoing expanded TBS and the refined RV can be used to increase the equivalent transmission code rate, and can even be used to enable the equivalent transmission code rate greater than 1.0. Therefore, a joint design of the expanded TBS and/or the refined RV may be performed based on the value of the equivalent transmission code rate of the expanded TBS, and specific information of the design is indicated to the terminal device in the foregoing manners, to be applicable to the data transmission under different channel conditions and different transmission requirements.

In some embodiments, after the TBS is expanded, a higher equivalent transmission code rate indicates a shorter length of an actually transmitted RV. To ensure that all RVs can traverse all bits of the coded mother code, more refined RVs need to be used. That is, a quantity of start positions of the RVs needs to be larger, so that reliability of the data transmission can be ensured with reference to a decoding gain by combination of HARQ retransmissions. The following provides descriptions by using an example.

If an initial transmission code rate (where a code rate on which the TBS scaling and the RV refining are not performed, or the transmission code rate may be determined by using a current technology) is ¾. That the TBS is expanded by using the radical-type scaling factor β of the transport block size is used as an example. If the value of the scaling factor β of the transport block size is 2, the equivalent transmission code rate is approximately equal to 3/2 (that is, a product of the initial code rate and the scaling factor). It may be understood that the foregoing description herein is approximately equal to that after the initial TBS is expanded by twice, the value of the expanded TBS needs to be determined based on the manner shown in step 2 in the description of the existing process of transmitting the TB in the NR system in the foregoing method embodiments. The value of the expanded TBS determined in this manner is approximately twice the initial TBS. In this case, the equivalent code rate is relatively high, and a more refined RV design, for example, 16 RVs, is recommended.

If that the TBS is expanded by using the moderate-type of scaling factor β of the transport block size is used as an example, and if the value of the scaling factor β of the transport block size is 1.4, the equivalent transmission code rate is approximately equal to 1.05 (that is, a product of the initial code rate and the scaling factor). It may be understood that the foregoing description herein is approximately equal to that after the initial TBS is expanded by 1.4 times, the value of the expanded TBS needs to be determined based on the manner shown in step 2 in the description of the existing process of transmitting the TB in the NR system in the foregoing method embodiments. The value of the expanded TBS determined in this manner is approximately 1.05 times the initial TBS. In this case, the equivalent code rate is relatively low, and a more refined RV design, for example, 8 RVs, is recommended.

In addition, when the first information is used to indicate the TBS configuration information and the RV configuration information, if the TBS configuration information is used to indicate the scaling factor β of the transport block size, and the RV configuration information is used to indicate a quantity M of RVs, for example, indication may be performed in a manner shown in the following Table 10:

TABLE 10

| | First field | | Second field |
|---|---|---|---|
| 1 (Radical) | 00 (β = 2) | 00 | 4 RVs |
| | 01 (β = 3) | 01 | 8 RVs |
| | 10 (β = 4) | 10 | 16 RVs |
| | 11 (β = 5) | 11 | 32 RVs |
| 0 (Moderate) | 00 (β = 1.2) | | |
| | 01 (β = 1.4) | | |
| | 10 (β = 1.6) | | |
| | 11 (β = 1.8) | | |

It may be understood that Table 10 is merely an example, and does not constitute a limitation on how the first information indicates the scaling factor β of the transport block size or on the quantity M of RVs. In addition, when the RV configuration information is used to indicate start position information of the M RVs, a manner similar to the manner shown in Table 10 may also be used. Details are not described herein again.

According to the data transmission method provided in this embodiment of this application, the network device may indicate the TBS configuration information and/or the RV configuration information to the terminal device by using the first information, and the network device may expand the TBS and/or refine the RV by using the TBS configuration information and/or the RV configuration information, so that the network device and the terminal device may transmit the TB by using the expanded TBS and/or the refined RV, thereby improving the spectral efficiency when the TB is transmitted.

Figure 4:
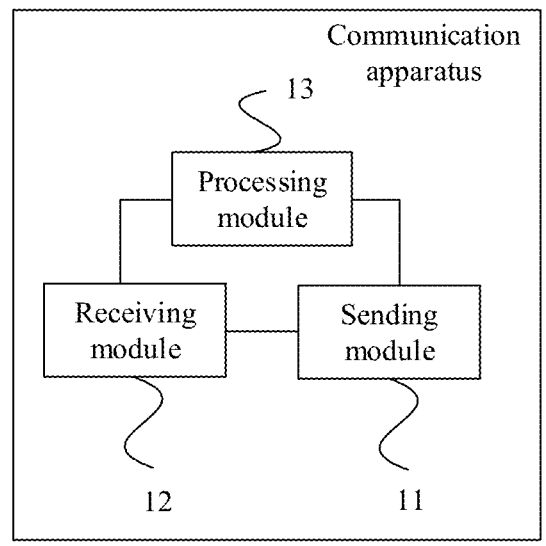
FIG. 4 is a schematic structural diagram of a communication apparatus according to an embodiment of this application.

FIG. 4 is a schematic structural diagram of a communication apparatus according to an embodiment of this application. The communication apparatus in this embodiment may be the foregoing network device, or may be a chip used in a network device. The communication apparatus may be configured to perform actions of the network device in the foregoing method embodiment. As shown in FIG. 4, the communication apparatus may include a sending module 11 and a receiving module 12. Optionally, the communication apparatus further includes a processing module 13.

The sending module 11 is configured to send first information to a terminal device, where the first information is used to indicate transport block size TBS configuration information and/or redundancy version RV configuration information, the TBS configuration information is used to configure a first transport block size TBS, and the RV configuration information is used to configure first RV information.

The receiving module 12 is configured to receive a transport block from the terminal device, or the sending module 11 is further configured to send a transport block to the terminal device, where a TBS of the transport block is the first TBS, and/or RV information of the transport block is the first RV information.

Optionally, the processing module 13 is configured to determine the TBS configuration information and/or the redundancy version RV configuration information, or determine the first TBS and/or the first RV information.

Optionally, the processing module 13 is configured to determine a first transport block. The first transport block is the transport block received by the receiving module 12, or the transport block sent by the sending module 11. For an explanation of the first transport block, refer to the description in the method embodiment.

In a possible implementation, the first RV information includes at least one of the following information: a quantity M of RVs and start position information of the M RVs, where M is an integer greater than or equal to 1. In an example, a start position of each RV may be determined based on a length of the mother code obtained after transport block coding, and a number of the start position of the RV in start positions of the M RVs. For example, the start position of each RV is determined based on the length of the mother code obtained after transport block coding, a first parameter, and the number of the start position of the RV in the start positions of the M RVs, where the first parameter is used to determine a check matrix dimension corresponding to a coding scheme used by the transport block; or the start position of each RV is determined based on the length of the mother code obtained after transport block coding, M, the number of the start position of the RV in the start positions of the M RVs, and a preset bit offset.

In a possible implementation, the processing module 13 is configured to determine a sequence of the M RVs. Optionally, the sending module 11 is further configured to send second information to the terminal device, where the second information is used to indicate the sequence of the M RVs. Alternatively, the first RV information further includes the sequence of the M RVs.

In this implementation, the receiving module 12 is specifically configured to receive a first RV of the transport block from the terminal device, or the sending module 11 is specifically configured to send a first RV of the transport block to the terminal device, where the first RV is an RV in the M RVs. Optionally, the receiving module 12 is further configured to receive a second RV of the transport block from the terminal device, or the sending module 11 is further configured to send a second RV of the transport block to the terminal device, where the second RV is an RV in the M RVs. The first RV and the second RV are different, and a sending sequence of the first RV and the second RV satisfies a sequence relationship indicated by the sequence.

Optionally, in the sequence relationship indicated by the sequence of the M RVs, a quantity of overlapping mother code bits in two adjacent RVs is the smallest, and bit start positions of the two adjacent RVs are the farthest in the mother code obtained after transport block coding. Alternatively, in the sequence relationship indicated by the sequence of the M RVs, a quantity of overlapping mother code bits in two adjacent RVs is the smallest, and the overlapping mother code bits include a largest quantity of system information bits.

In a possible implementation, the TBS configuration information is used to indicate a scaling factor of the transport block size, and the scaling factor is greater than 1. Alternatively, the TBS configuration information includes enabling information, and the enabling information is used to indicate whether to expand the transport block size. Optionally, when the enabling information is used to indicate to expand the transport block size, the enabling information is further used to indicate the scaling factor of the transport block size, where the scaling factor is greater than 1, or there is a correspondence between the scaling factor and a transmission parameter of the transport block. Alternatively, the sending module 11 is further configured to send third information to the terminal device, where the third information is used to indicate the scaling factor of the transport block size, and the scaling factor is greater than 1.

The communication apparatus provided in this embodiment of this application may perform actions of the network device in the foregoing method embodiment. Implementation principles and technical effects thereof are similar. Details are not described herein again.

Figure 5:
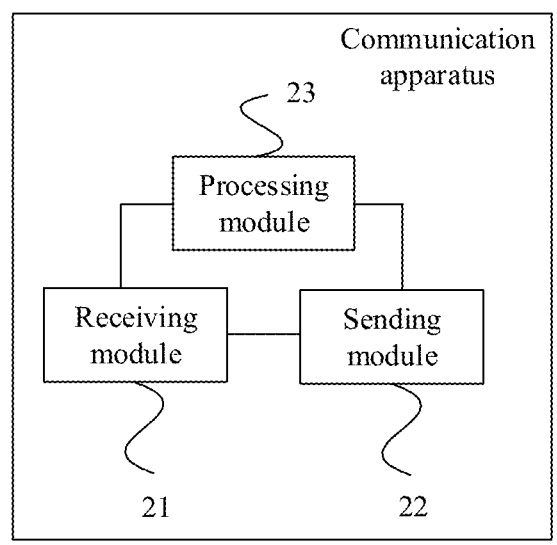
FIG. 5 is a schematic structural diagram of another communication apparatus according to an embodiment of this application.

FIG. 5 is a schematic structural diagram of another communication apparatus according to an embodiment of this application. The communication apparatus in this embodiment may be the foregoing terminal device, or may be a chip used in a terminal device. The communication apparatus may be configured to perform actions of the terminal device in the foregoing method embodiment. As shown in FIG. 5, the communication apparatus may include a receiving module 21 and a sending module 22. Optionally, the communication apparatus may further include a processing module 23.

The receiving module 21 is configured to receive first information from a network device, where the first information is used to indicate transport block size TBS configuration information and/or redundancy version RV configuration information, the TBS configuration information is used to configure a first transport block size TBS, and the RV configuration information is used to configure first RV information.

The sending module 22 is configured to send a transport block to the network device based on the TBS configuration information and/or the RV configuration information, or the receiving module 21 is further configured to receive a transport block from the network device based on the TBS configuration information and/or the RV configuration information, where a TBS of the transport block is the first TBS, and/or RV information of the transport block is the first RV information.

Optionally, the processing module 23 is configured to determine the TBS configuration information and/or the RV configuration information, or determine the first TBS and/or the first RV information. Specifically, the processing module 23 determines the TBS configuration information and/or the RV configuration information based on the first information.

Optionally, the processing module 23 is configured to determine a first transport block. The first transport block is the transport block received by the receiving module 21, or the transport block sent by the sending module 22.

In a possible implementation, the first RV information includes at least one of the following information: a quantity M of RVs and start position information of the M RVs, where M is an integer greater than or equal to 1. In an example, a start position of each RV may be determined based on a length of the mother code obtained after transport block coding, and a number of the start position of the RV in start positions of the M RVs. For example, the start position of each RV is determined based on the length of the mother code obtained after transport block coding, a first parameter, and the number of the start position of the RV in the start positions of the M RVs, where the first parameter is used to determine a check matrix dimension corresponding to a coding scheme used by the transport block; or the start position of each RV is determined based on the length of the mother code obtained after transport block coding, M, the number of the start position of the RV in the start positions of the M RVs, and a preset bit offset.

In a possible implementation, the processing module 23 is configured to determine a sequence of the M RVs. Optionally, the receiving module 21 is further configured to receive second information from the network device, where the second information is used to indicate the sequence of the M RVs. Alternatively, the first RV information further includes the sequence of the M RVs.

In this implementation, the sending module 22 is specifically configured to send a first RV of the transport block to the network device based on the TBS configuration information and/or the RV configuration information, or the receiving module 21 is specifically configured to receive a first RV of the transport block from the network device based on the TBS configuration information and/or the RV configuration information, where the first RV is an RV in the M RVs. Optionally, the sending module 22 is further configured to send a second RV of the transport block to the network device based on the TBS configuration information and/or the RV configuration information, or the receiving module 21 is further configured to receive a second RV of the transport block from the network device based on the TBS configuration information and/or the RV configuration information, where the second RV is an RV in the M RVs. The first RV and the second RV are different, and a sending sequence of the first RV and the second RV satisfies a sequence relationship indicated by the sequence.

Optionally, in the sequence relationship indicated by the sequence of the M RVs, a quantity of overlapping mother code bits in two adjacent RVs is the smallest, and bit start positions of the two adjacent RVs are the farthest in the mother code obtained after transport block coding. Alternatively, in the sequence relationship indicated by the sequence of the M RVs, a quantity of overlapping mother code bits in two adjacent RVs is the smallest, and the overlapping mother code bits include a largest quantity of system information bits.

In a possible implementation, the TBS configuration information is used to indicate a scaling factor of the transport block size, and the scaling factor is greater than 1. Alternatively, the TBS configuration information includes enabling information, and the enabling information is used to indicate whether to expand the transport block size. Optionally, when the enabling information is used to indicate to expand the transport block size, the enabling information is further used to indicate the scaling factor of the transport block size, where the scaling factor is greater than 1, or there is a correspondence between the scaling factor and a transmission parameter of the transport block. Alternatively, the receiving module 21 is further configured to receive third information from the network device, where the third information is used to indicate the scaling factor of the transport block size, and the scaling factor is greater than 1.

The communication apparatus provided in this embodiment of this application may perform actions of the terminal device in the foregoing method embodiment. Implementation principles and technical effects thereof are similar. Details are not described herein again.

It should be understood that the sending module may be a transmitter in actual implementation, and the receiving module may be a receiver in actual implementation. The processing module may be implemented in a form of software invoked by a processing element, or may be implemented in a form of hardware. For example, the processing module may be an independently disposed processing element, or may be integrated into a chip of the foregoing device for implementation. In addition, the processing module may alternatively be stored in a memory of the foregoing device in a form of program code, and invoked by a processing element of the foregoing device to perform functions of the foregoing processing module. In addition, all or some of the modules may be integrated together, or may be implemented independently. The processing element described herein may be an integrated circuit with a signal processing capability. In an implementation process, steps in the foregoing methods or the foregoing modules can be implemented by using a hardware integrated logic circuit in the processor element, or by using instructions in a form of software.

For example, the foregoing modules may be configured as one or more integrated circuits for implementing the foregoing method, such as one or more application-specific integrated circuits (ASIC), one or more microprocessors (DSP), or one or more field programmable gate arrays (FPGA). For another example, when one of the foregoing modules is implemented in a form of scheduling program code by a processing element, the processing element may be a general-purpose processor, for example, a central processing unit (CPU) or another processor that can invoke the program code. For still another example, these modules may be integrated together and implemented in a form of a system-on-a-chip (SOC).

Figure 6:
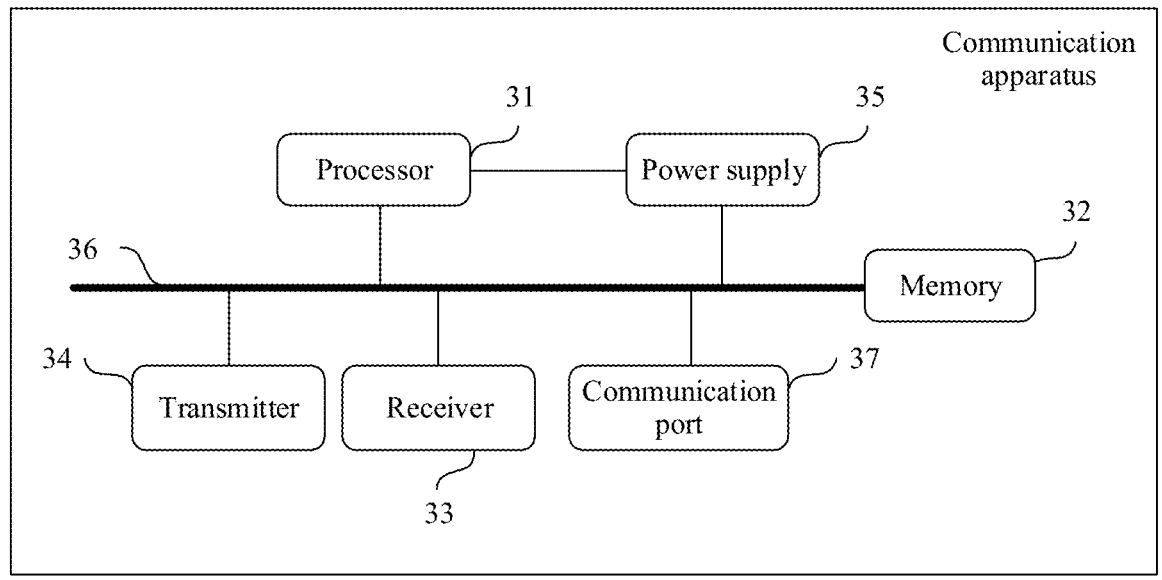
FIG. 6 is a schematic structural diagram of still another communication apparatus according to an embodiment of this application.

FIG. 6 is a schematic structural diagram of still another communication apparatus according to an embodiment of this application. As shown in FIG. 6, the communication apparatus may include a processor 31 (for example, a CPU), a memory 32, a receiver 33, and a transmitter 34. Both the receiver 33 and the transmitter 34 are coupled to the processor 31, and the processor 31 controls a receiving action of the receiver 33 and a sending action of the transmitter 34. The memory 32 may include a high-speed random access memory (RAM), and may further include a non-volatile memory (NVM), for example, at least one magnetic disk storage. The memory 32 may store various instructions, to complete various processing functions and implement method steps of this application. Optionally, the communication apparatus in this application may further include a power supply 35, a communication bus 36, and a communication port 37. The receiver 33 and the transmitter 34 may be integrated into a transceiver of the communication apparatus, or may be independent transceiver antennas on the communication apparatus. The communication bus 36 is configured to implement a communication connection between elements. The communication port 37 is configured to implement connection and communication between the communication apparatus and another peripheral.

In this embodiment of this application, the memory 32 is configured to store computer-executable program code, and the program code includes instructions. When the processor 31 executes the instructions, the instructions enable the processor 31 of the communication apparatus to perform a processing action of the terminal device in the foregoing method embodiment, the receiver 33 to perform a receiving action of the terminal device in the foregoing method embodiment, and the transmitter 34 to perform a sending action of the terminal device in the foregoing method embodiment. Implementation principles and technical effects thereof are similar. Details are not described herein again.

Figure 7:
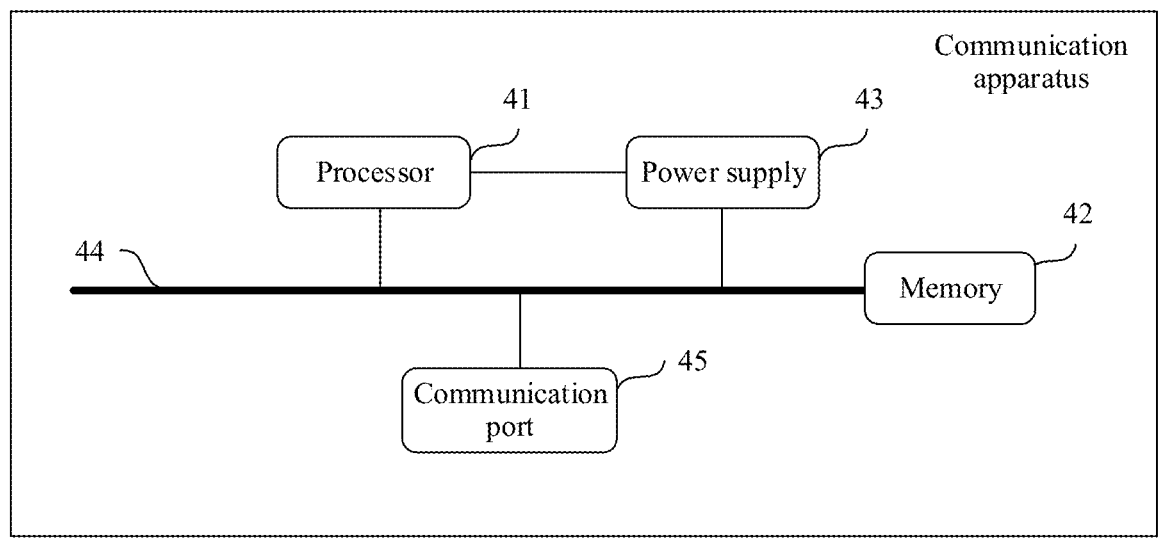
FIG. 7 is a schematic structural diagram of still another communication apparatus according to an embodiment of this application.

FIG. 7 is a schematic structural diagram of still another communication apparatus according to an embodiment of this application. As shown in FIG. 7, the communication apparatus may include a processor 41 (for example, a CPU) and a memory 42. The memory 42 may include a high-speed random access memory (RAM), and may further include a non-volatile memory (NVM), for example, at least one magnetic disk storage. The memory 42 may store various instructions, to complete various processing functions and implement method steps of this application. Optionally, the communication apparatus in this application may further include a power supply 43, a communication bus 44, and a communication port 45. The communication bus 44 is configured to implement a communication connection between elements. The communication port 45 is configured to implement connection and communication between the communication apparatus and another peripheral.

In this embodiment of this application, the memory 42 is configured to store computer-executable program code, and the program code includes instructions. When the processor 41 executes the instructions, the instructions enable the processor 41 of the communication apparatus to perform actions of the network device in the foregoing method embodiment. Implementation principles and technical effects thereof are similar. Details are not described herein again.

All or some of the foregoing embodiments may be implemented by using software, hardware, firmware, or any combination thereof. When the software is used to implement the embodiments, all or some embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk, (SSD)), or the like.

"A plurality of" in this application refers to two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the formula, the character "/" indicates a "division" relationship between the associated objects.

It may be understood that various numbers in the embodiments of this application are merely used for differentiation for ease of description, and are not used to limit the scope of the embodiments of this application.

It may be understood that in the embodiments of this application, sequence numbers of the foregoing processes do not mean execution sequences. The execution sequences of the processes should be determined based on functions and internal logic of the processes, and should not be construed as any limitation on the implementation processes of the embodiments of this application.

What is claimed is:

1. A data transmission method, wherein the method comprises:

sending, by a network device, first information to a terminal device, wherein the first information indicates at least one of transport block size (TBS) configuration information or redundancy version (RV) configuration information, the TBS configuration information configures a first TBS, and the RV configuration information configures a first RV information; and performing, by the network device, at least one of:
receiving, by the network device, a transport block from the terminal device; or
sending, by the network device, the transport block to the terminal device;

wherein:
a TBS of the transport block is the first TBS; or
an RV information of the transport block is the first RV information;

wherein:
the first TBS is an expanded TBS enabling more bits for a resource unit to be transmitted to increase a transmission code rate and the first RV information is a refined RV having a smaller granularity for reducing a minimum quantity of resources used to provide correct decoding, a spectral efficiency is increased in response to receiving or sending the transport block based on the expanded TBS or based on the refined RV.

2. The method according to claim 1, wherein
the expanded TBS and the refined RV are used together to increase the spectral efficiency in response to receiving or sending the transport block based on the expanded TBS and based on the refined RV.

3. The method according to claim 1, wherein the first RV information comprises at least one of a quantity M, wherein the quantity M is an integer greater or equal to 1 that indicates a number of RVs, or information of a start position of the RVs, and wherein the start position of each RV of the RVs is determined based on a length of a mother code obtained after transport block coding and a number of the start position of the RV in start positions of the RVs.

4. The method according to claim 3, wherein the start position of each RV of the RVs is determined based on the length of the mother code obtained after the transport block coding, a first parameter, and the number of the start position of the RV in the start positions of the RVs, wherein the first parameter determines a check matrix dimension corresponding to a coding scheme used by the transport block; or
the start position of each RV is determined based on the length of the mother code obtained after the transport block coding, the quantity M, the number of the start position of the RV in the start positions of the RVs, and a preset bit offset.

5. The method according to claim 2, wherein:
the first RV information further comprises a sequence of the RVs; or
the sequence of the RVs is indicated by second information which are sent to the terminal device.

6. A data transmission method, wherein the method comprises:

receiving, by a terminal device, first information from a network device, wherein the first information indicates at least one of transport block size (TBS) configuration information or redundancy version (RV) configuration information, the TBS configuration information configures a first TBS, and the RV configuration information configures a first RV information; and performing, by the terminal device, at least one of:
sending, by the terminal device, a transport block to the network device based on the at least one of the TBS configuration information or the RV configuration information; or
receiving, by the terminal device, the transport block from the network device based on the at least one of the TBS configuration information or the RV configuration information;

wherein:
a TBS of the transport block is the first TBS; or
an RV information of the transport block is the first RV information wherein:
the first TBS is an expanded TBS enabling more bits for a resource unit to be transmitted to increase a transmission code rate and the first RV information is a refined RV having a smaller granularity for reducing a minimum quantity of resources used to provide correct decoding, a spectral efficiency is increased in response to receiving or sending the transport block based on the expanded TBS or based on the refined RV.

7. The method according to claim 6, wherein
the expanded TBS and the refined RV are used together to increase the spectral efficiency in response to receiving or sending the transport block based on the expanded TBS and based on the refined RV.

8. The method according to claim 6, wherein the first RV information comprises at least one of a quantity M, wherein the quantity M is an integer greater or equal to 1 that indicates a number of RVs, or information of a start position of the RVs, and wherein the start position of each RV of the RVs is determined based on a length of a mother code obtained after transport block coding and a number of the start position of the RV in start positions of the RVs.

9. The method according to claim 8, wherein the start position of each RV of the RVs is determined based on the length of the mother code obtained after the transport block coding, a first parameter, and the number of the start position of the RV in the start positions of the RVs, wherein the first parameter determines a check matrix dimension corresponding to a coding scheme used by the transport block; or
the start position of each RV is determined based on the length of the mother code obtained after the transport block coding, the quantity M, the number of the start position of the RV in the start positions of the RVs, and a preset bit offset.

10. The method according to claim 7, wherein:
the first RV information further comprises a sequence of the RVs; or
the sequence of the RVs is indicated by second information which are sent to the terminal device.

11. A communication apparatus, comprising:
one or more processors; and
a memory configured to store program instructions;
wherein, when executed by the one or more processors, the program instructions cause the communications apparatus to:
send first information to a terminal device, wherein the first information indicates at least one of transport block size (TBS) configuration information or redundancy version (RV) configuration information, the TBS configuration information configures a first TBS, and the RV configuration information configures a first RV information; and
perform at least one of:
receive a transport block from the terminal device; or
send the transport block to the terminal device;
wherein:
a TBS of the transport block is the first TBS; or
an RV information of the transport block is the first RV information;
wherein the first TBS is an expanded TBS enabling more bits for a resource unit to be transmitted to increase a transmission code rate and the first RV information is a refined RV having a smaller granularity for reducing a minimum quantity of resources used to provide correct decoding, a spectral efficiency is increased in response to receiving or sending the transport block based on the expanded TBS or based on the refined RV.

12. The apparatus according to claim 11, wherein the expanded TBS and the refined RV are used together to increase the spectral efficiency in response to receiving or sending the transport block based on the expanded TBS and based on the refined RV.

13. The apparatus according to claim 11, wherein the first RV information comprises at least one of a quantity M, wherein the quantity M is an integer greater or equal to 1 that indicates a number of RVs, or information of a start position of the RVs, and wherein the start position of each RV of the RVs is determined based on a length of a mother code obtained after transport block coding and a number of the start position of the RV in start positions of the RVs.

14. The apparatus according to claim 13, wherein the start position of each RV of the RVs is determined based on the length of the mother code obtained after the transport block coding, a first parameter, and the number of the start position of the RV in the start positions of the RVs, wherein the first parameter determines a check matrix dimension corresponding to a coding scheme used by the transport block; or
the start position of each RV is determined based on the length of the mother code obtained after the transport block coding, the quantity M, the number of the start position of the RV in the start positions of the RVs, and a preset bit offset.

15. The apparatus according to claim 11, wherein:
the first RV information further comprises a sequence of the RVs; or
the sequence of the RVs is indicated by second information which are sent to the terminal device.

16. A communication apparatus, comprising:
one or more processors; and
a memory configured to store program instructions;
wherein, when executed by the one or more processors, the program instructions cause the communications apparatus to:
receive first information from a network device, wherein the first information indicates at least one of transport block size (TBS) configuration information or redundancy version (RV) configuration information, the TBS configuration information configures a first TBS, and the RV configuration information configures a first RV information; and
perform at least one of:
send a transport block to the network device based on the at least one of the TBS configuration information or the RV configuration information; or
receive the transport block from the network device based on the at least one of the TBS configuration information or the RV configuration information;
wherein:
a TBS of the transport block is the first TBS; or
an RV information of the transport block is the first RV information
wherein:
the first TBS is an expanded TBS enabling more bits for a resource unit to be transmitted to increase a transmission code rate and the first RV information is a refined RV having a smaller granularity for reducing a minimum quantity of resources used to provide correct decoding, a spectral efficiency is increased in response to receiving or sending the transport block based on the expanded TBS or based on the refined RV.

17. The apparatus according to claim 16, wherein the expanded TBS and the refined RV are used together to increase the spectral efficiency in response to receiving or sending the transport block based on the expanded TBS and based on the refined RV.

18. The apparatus according to claim 16, wherein the first RV information comprises at least one of a quantity M, wherein the quantity M is an integer greater or equal to 1 that indicates a number of RVs, or information of a start position of the RVs, and wherein the start position of each RV of the RVs is determined based on a length of a mother code obtained after transport block coding and a number of the start position of the RV in start positions of the RVs.

19. The apparatus according to claim 18, wherein the start position of each RV of the RVs is determined based on the length of the mother code obtained after the transport block coding, a first parameter, and the number of the start position of the RV in the start positions of the RVs, wherein the first parameter determines a check matrix dimension corresponding to a coding scheme used by the transport block; or
the start position of each RV is determined based on the length of the mother code obtained after the transport block coding, the quantity M, the number of the start position of the RV in the start positions of the RVs, and a preset bit offset.

20. The apparatus according to claim 17, wherein:
the first RV information further comprises a sequence of the RVs; or
the sequence of the RVs is indicated by second information which are sent to the terminal device.

* * * * *

UNITED STATES PATENT AND TRADEMARK OFFICE
CERTIFICATE OF CORRECTION

| | | |
|---|---|---|
| PATENT NO. | : 11,895,534 B2 | Page 1 of 1 |
| APPLICATION NO. | : 17/352749 | |
| DATED | : February 6, 2024 | |
| INVENTOR(S) | : Yawei Yu et al. | |

It is certified that error appears in the above-identified patent and that said Letters Patent is hereby corrected as shown below:

In the Specification

The formula (10) in Column 22, Line 57 should be replaced with the following:
$RV^{(i)} = \arg\min sub(\Lambda^{(i)}, \Lambda^{(i-1)})$ Column 23, Line 3-8 should be replaced with:
Sub $(\Lambda^{(i)}, \Lambda^{(i-1)})$ represents a quantity of elements that $\Lambda^{(i)}$ overlaps with $\Lambda^{(i-1)}$. If there are a plurality of $RV^{(i)}$ values that meet a same condition $sub(\Lambda^{(i)}, \Lambda^{(i-1)})$, the values are defined as a set $RV = \{RV^{(i_1)}, RV^{(i_2)}, ..., RV^{(i_K)}\}$, and one $RV^{(i)}$ may be selected from the RV set. A selection method includes but is not limited to the following two manners:

Signed and Sealed this
Fourteenth Day of May, 2024

Katherine Kelly Vidal
*Director of the United States Patent and Trademark Office*